(12) United States Patent
Yeo et al.

(10) Patent No.: US 11,598,912 B2
(45) Date of Patent: Mar. 7, 2023

(54) SINGLE EDGE LIT LIGHTING MODULE WITH BI-LOBED LIGHT DISTRIBUTION

(71) Applicants: Fusion Optix, Inc., Woburn, MA (US); Axis Lighting, Inc., LaSalle (CA)

(72) Inventors: Terence Yeo, Boston, MA (US); Timothy Kelly, Brookline, MA (US); Howard Yaphe, Saint-Laurent (CA); Stephane Beland, Saint-Jean-sur-Richelieu (CA); Jean Gagne, Saint-Lazare (CA); Andrew Miles, Cornwall (CA)

(73) Assignees: Fusion Optix, Inc., Woburn, MA (US); Axis Lighting, Inc., LaSalle (CA)

( * ) Notice: Subject to any disclaimer, the term of this patent is extended or adjusted under 35 U.S.C. 154(b) by 0 days.

(21) Appl. No.: 17/580,218

(22) Filed: Jan. 20, 2022

(65) Prior Publication Data
US 2022/0342141 A1 Oct. 27, 2022

Related U.S. Application Data

(63) Continuation-in-part of application No. 17/501,840, filed on Oct. 14, 2021, now Pat. No. 11,520,097, (Continued)

(51) Int. Cl.
  *G02B 6/00* (2006.01)
  *F21V 8/00* (2006.01)

(52) U.S. Cl.
  CPC ......... *G02B 6/0031* (2013.01); *G02B 6/0041* (2013.01); *G02B 6/0065* (2013.01); *G02B 6/0073* (2013.01)

(58) Field of Classification Search
  CPC .... G02B 6/009; G02B 6/0091; G02B 6/0086; G02B 6/0036; G02B 6/38; G02B 6/004; G02B 6/0041; G02B 6/0043
  See application file for complete search history.

(56) References Cited

U.S. PATENT DOCUMENTS 7,665,865 B1 * 2/2010 Hulse ................... F21K 9/64
  362/277
8,430,548 B1 * 4/2013 Kelly ................. G02B 6/0051
  362/613

(Continued)

*Primary Examiner* — Gerald J Sufleta, II

(57) ABSTRACT

A single edge lit lighting module is disclosed which produces tailored light distributions valuable in many illumination applications. The lighting module comprises a unique light scattering optical element which is aligned with one or more LED light sources along one of its edges and works in combination with configured reflective surfaces. Light distributions attainable using the invention include, but are not limited to, symmetric and asymmetric bi-lobed "batwing" distributions for wide area direct and indirect lighting, and tilted or asymmetric distributions for perimeter lighting. It is also possible to achieve more rounded and symmetric distributions by an additional diffuser as a cover lens. The invention's unique single edge lit construction provides the means for achieving the lighting distributions without the need for conventional two lit edges and within a compact form factor with narrow width. The invention is particularly well-suited for linear lighting fixtures that are surface mounted, suspended or recessed. Various embodiments also provide means for adjusting light distributions dynamically to control light output characteristics by controlling the input signals to the LED board included in the assembly.

40 Claims, 27 Drawing Sheets

Related U.S. Application Data which is a continuation-in-part of application No. 15/887,801, filed on Feb. 2, 2018, now Pat. No. 11,156,762.

(60) Provisional application No. 62/453,588, filed on Feb. 2, 2017.

(56) References Cited

U.S. PATENT DOCUMENTS

| | | | | |
|---|---|---|---|---|
| 10,436,969 B2* | 10/2019 | Yuan | .......................... | F21K 9/61 |
| 2003/0210222 A1* | 11/2003 | Ogiwara | .............. | G02B 6/0061 |
| | | | | 345/103 |
| 2006/0227546 A1* | 10/2006 | Yeo | ...................... | G02B 5/0284 |
| | | | | 362/227 |
| 2008/0266879 A1* | 10/2008 | Chang | .................. | G02B 6/0021 |
| | | | | 362/330 |
| 2008/0278943 A1* | 11/2008 | Van Der Poel | ......... | F21V 11/06 |
| | | | | 362/240 |
| 2012/0163024 A1* | 6/2012 | Edamitsu | ................... | F21V 5/02 |
| | | | | 362/611 |
| 2012/0236595 A1* | 9/2012 | Parker | ...................... | F21V 9/40 |
| | | | | 362/609 |
| 2012/0287674 A1* | 11/2012 | Nichol | ................. | G02B 6/0018 |
| | | | | 264/1.24 |
| 2013/0181246 A1* | 7/2013 | Wu | .......................... | F21V 7/28 |
| | | | | 438/27 |
| 2013/0208495 A1* | 8/2013 | Dau | ..................... | G02B 6/0078 |
| | | | | 362/551 |
| 2013/0258709 A1* | 10/2013 | Thompson | ........... | G02B 6/0023 |
| | | | | 362/608 |
| 2014/0126236 A1* | 5/2014 | Song | .................... | G02B 6/0041 |
| | | | | 362/607 |
| 2014/0211495 A1* | 7/2014 | Yuan | .................... | G02B 6/0035 |
| | | | | 362/555 |
| 2015/0029717 A1* | 1/2015 | Shen | ....................... | F21V 3/049 |
| | | | | 362/297 |
| 2015/0049511 A1* | 2/2015 | Tarsa | ........................ | F21S 8/04 |
| | | | | 362/611 |
| 2015/0177439 A1* | 6/2015 | Durkee | ................ | G02B 6/0063 |
| | | | | 362/555 |
| 2016/0047969 A1* | 2/2016 | Lim | .......................... | G02B 6/34 |
| | | | | 362/619 |
| 2016/0329020 A1* | 11/2016 | Ma | ........................ | G02B 6/0036 |
| 2017/0097448 A1* | 4/2017 | Wang | ....................... | F21V 13/04 |
| 2017/0123134 A1* | 5/2017 | Moon | .................. | G02B 6/0061 |
| 2017/0153007 A1* | 6/2017 | Banin | ..................... | F21V 11/00 |
| 2018/0231708 A1* | 8/2018 | Liu | ........................ | G02B 6/0065 |
| 2018/0284339 A1* | 10/2018 | Isbrucker | ............. | G02B 6/0018 |
| 2019/0041318 A1* | 2/2019 | Wissmann | ............. | G01N 21/31 |

* cited by examiner

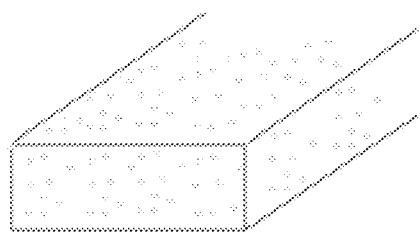
(i) Diffuse Planar (No surface features)
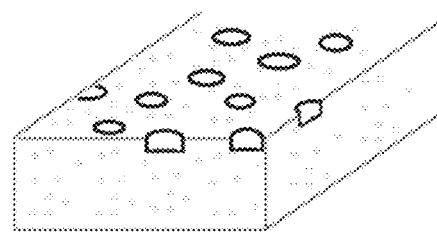
(ii) Diffuse laser etched
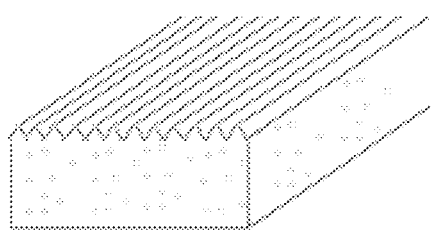
(iii) Diffuse lenticular
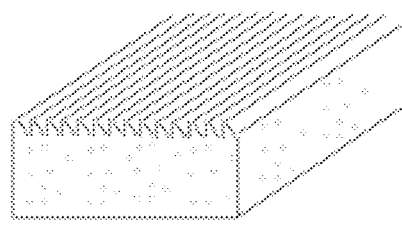
(iv) Diffuse sawtooth
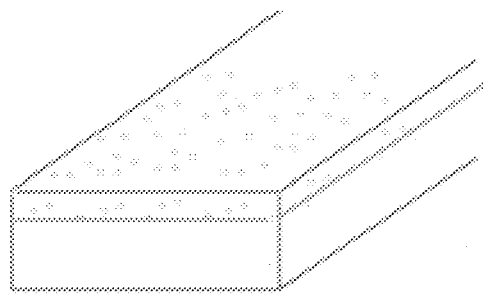
(v) Diffuse layer (laminated)
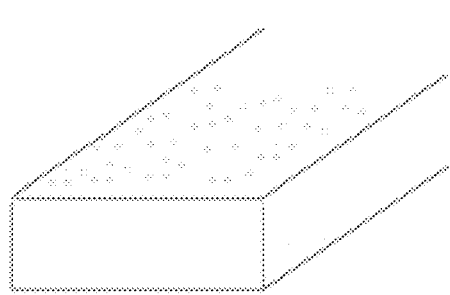
(vi) Diffuse surface (coated)
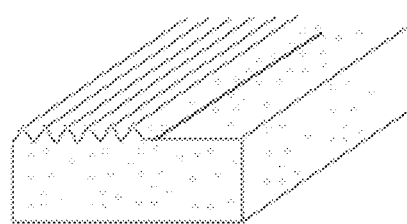
(vii) Diffuse patterned
Fig. 2B

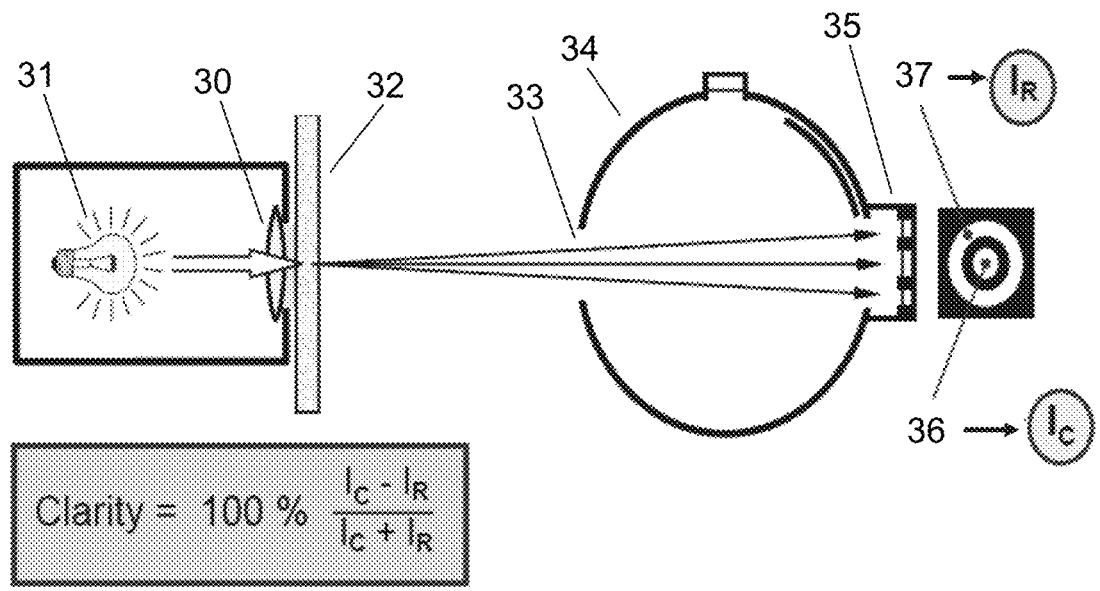
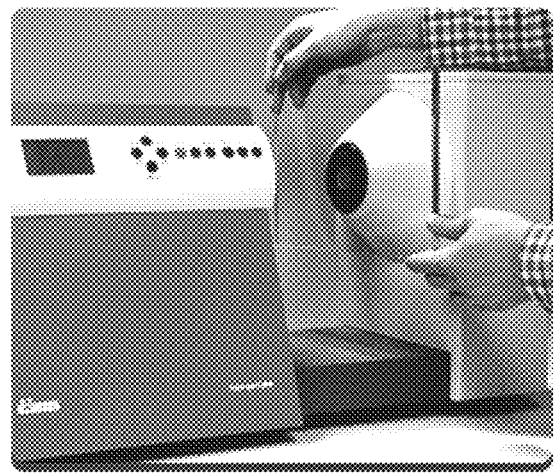
Example of Haze Gard Plus use per ASTM D1003
for transmission and haze
Fig. 2C

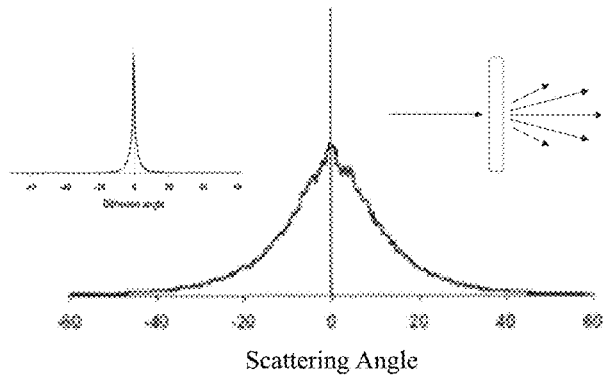

Scattering Angle

| Sample | Type | Height | ASTM D1003 | | | Scattering (FWHM) | | Gloss (60%) | |
|---|---|---|---|---|---|---|---|---|---|
| | | | T% | H% | C% | TD | MD | Side A | Side B |
| Clear Etched Light Guide | | 4.5mm | 89.4 | 12.5 | 98.6 | 1° | 1° | 129.9 | 110.2 |
| Edge-lit Signage Acrylic | | 4.0mm | 92.6 | 4.1 | 99.8 | 1° | 1° | 139.7 | 140.5 |
| (i) | Diffuse planar | 4.7mm | 90.6 | 97.1 | 9.1 | 10° | 16° | 62.4 | 63.5 |
| (ii) | Diffuse laser etched | 4.5mm | 92.8 | 94.5 | 3.7 | 20° | 18° | 85.7 | 64.3 |
| (iii) | Diffuse lenticular | 4.6mm | 86.9 | 92.3 | 23.6 | 25° | 2° | 86.5 | 11.9 |
| (iv-a) | Diffuse sawtooth | 4.4mm | 82.6 | 97.6 | 4.3 | 5° | 17° | 74.7 | 5.9 |
| (iv-b) | Diffuse sawtooth | 3.8mm | 91.7 | 84.9 | 13.0 | 5° | 17° | 78.5 | 5.9 |
| (iv-c) | Diffuse sawtooth | 4.8mm | 91.6 | 80.2 | 17.8 | 5° | 17° | 74.7 | 5.9 |
| (v-a) | Diffuse layer (laminated) | 4.6mm | 91.5 | 86.3 | 15.2 | 11° | 10° | 88.4 | 55.6 |
| (v-b) | Diffuse layer (laminated) | 4.6mm | 90.2 | 90.6 | 7.3 | 15° | 14° | 90.2 | 45.2 |
| (v-c) | Diffuse layer (laminated) | 4.6mm | 92.0 | 94.1 | 3.9 | 30° | 30° | 87.6 | 34.5 |
| (v-d) | Diffuse layer (laminated) | 4.6mm | 86.8 | 94.9 | 5.6 | 40° | 30° | 85.7 | 86.1 |
| (vi-a) | Diffuse surface (coated) | 4.5mm | 93.0 | 95.1 | 3.6 | 20° | 18° | 91.1 | 6.3 |
| (vi-b) | Diffuse surface (coated) | 4.5mm | 89.8 | 100 | 2.3 | 40° | 40° | 92.4 | 4.3 |

Fig. 2D

| Module Embodiment | Optical Element | | | | | | Reflector |
|---|---|---|---|---|---|---|---|
| | Type | Surface Orientation | Height (mm) | Width (mm) | Surface Feature | Bulk Diffusion Concentration | |
| A1 | Diffuse Lenticular | Surface Features on Outer Face | 4.5 | 18 | M1000 Lenticular (Fig. 5) | 2% | Specular |
| A2 | Diffuse Lenticular | Surface Features on Inner Face | 4.5 | 18 | M1000 Lenticular (Fig. 5) | 2% | Specular |
| B1 | Diffuse Lenticular | Surface Features on Outer Face | 4.5 | 18 | M1000 Lenticular (Fig. 5) | 2% | Specular |
| B2 | Diffuse Lenticular | Surface Features on Inner Face | 4.5 | 18 | M1000 Lenticular (Fig. 5) | 2% | Specular |
| C2% | Diffuse Lenticular | Surface Features on Inner Face | 4.5 | 18 | M1000 Lenticular (Fig. 5) | 2% | Specular |
| C5% | Diffuse Lenticular | Surface Features on Inner Face | 4.5 | 18 | M1000 Lenticular (Fig. 5) | 5% | Specular |
| C10% | Diffuse Lenticular | Surface Features on Inner Face | 4.5 | 18 | M1000 Lenticular (Fig. 5) | 10% | Specular |
| C20% | Diffuse Lenticular | Surface Features on Inner Face | 4.5 | 18 | M1000 Lenticular (Fig. 5) | 20% | Specular |
| D | Diffuse Lenticular | Surface Features on Inner Face | 4.5 | 18 | M1000 Lenticular (Fig. 5) | 5% | Specular |

Fig. 3A

| Module Embodiment | Optical Element | | | | | | Reflector |
|---|---|---|---|---|---|---|---|
| | Type | Surface Orientation | Height (mm) | Width (mm) | Surface Feature | Bulk Diffusion Concentration | |
| E1 | Diffuse Patterned | Surface Features on Outer Face (Fig. 14) | 4.5 | 18 | 12-6 pattern (Fig. 6 Embodiment E) | 0% | Specular |
| E1 | Diffuse Patterned | Surface Features on Outer Face (Fig. 14) | 4.5 | 18 | | 2% | Specular |
| E2 | Diffuse Patterned | Surface Features on Inner Face (Fig. 15) | 4.5 | 18 | | 5% | Specular |
| E2 | Diffuse Patterned | Surface Features on Inner Face (Fig. 15) | 4.5 | 18 | | 8% | Specular |
| F1 | Diffuse Patterned | Surface Features on Outer Face (Fig. 16) | 4.5 | 18 | 12-6 pattern (Fig. 6 Embodiment F) | 0% | Specular |
| F1 | Diffuse Patterned | Surface Features on Outer Face (Fig. 16) | 4.5 | 18 | | 2% | Specular |
| F2 | Diffuse Patterned | Surface Features on Inner Face (Fig. 17) | 4.5 | 18 | | 5% | Specular |
| F2 | Diffuse Patterned | Surface Features on Inner Face (Fig. 17) | 4.5 | 18 | | 8% | Specular |
| G10% | Diffuse Planar | NO FEATURES | 4.5 | 18 | NO FEATURES | 10% | Specular |
| G10% Etched | Diffuse Laser Etched | Surface on Inner Face | 4.5 | 18 | ETCHED LIGHT GUIDE | 10% | Specular |

Fig. 3B

| Module Embodiment | Optical Element | | | | | | Reflector |
|---|---|---|---|---|---|---|---|
| | Type | Surface Orientation | Height (mm) | Width (mm) | Surface Feature | Bulk Diffusion Concentration | |
| H1 | Diffuse Sawtooth | Surface Features on Outer Face and away from LED | 3.8 | 17.8 | Sawtooth | | Specular |
| H2 | Diffuse Sawtooth | Surface Features on Outer Face and towards LED | 4.8 | 17.8 | Sawtooth | | Specular |
| I1 | Diffuse Layer | NO FEATURES | 4.5 | 17.8 | NO FEATURES | | Specular |
| I2 | Diffuse Layer | NO FEATURES | 4.5 | 17.8 | NO FEATURES | | Specular |
| I3 | Diffuse Layer | NO FEATURES | 4.5 | 17.8 | NO FEATURES | | Specular |
| I4 | Diffuse Layer | NO FEATURES | 4.5 | 17.8 | NO FEATURES | | Specular |

Fig. 3C

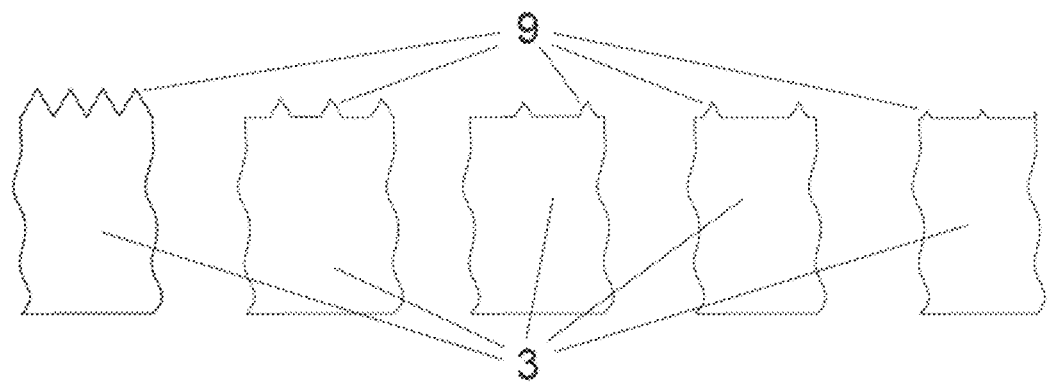
| Surface | Surface | Surface | Surface | Surface |
| Pattern SP1 | Pattern SP2 | Pattern SP2 | Pattern SP3 | Pattern SP3 |
Fig. 4
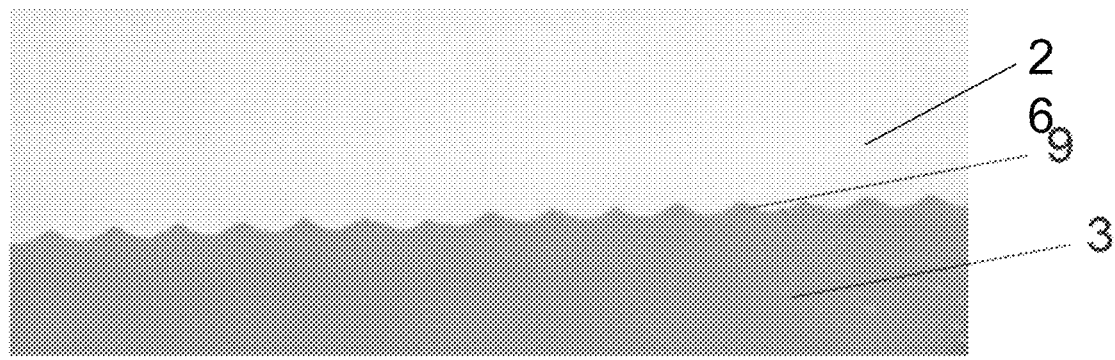
Fig. 5
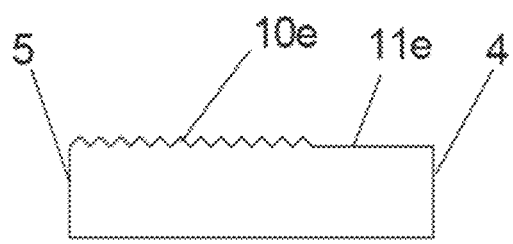 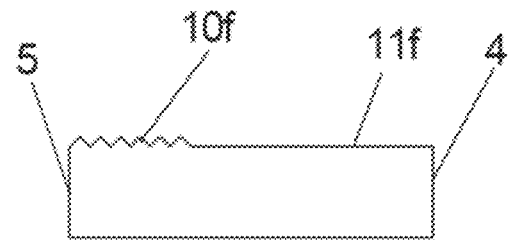
Embodiment E        Embodiment F
Fig. 6

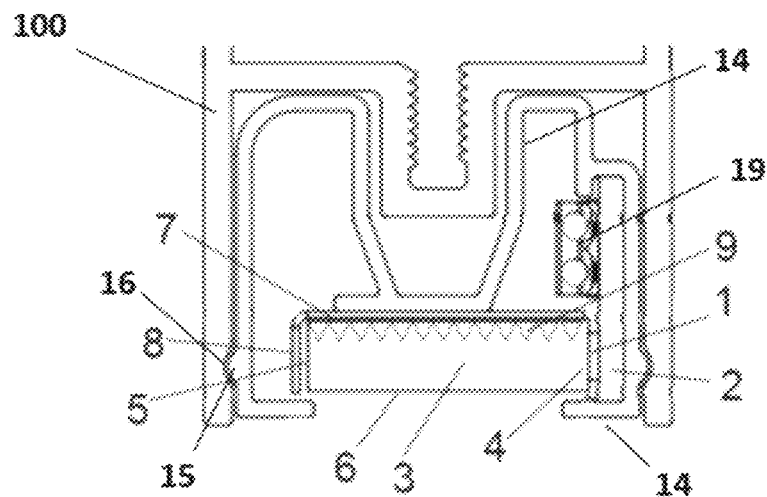
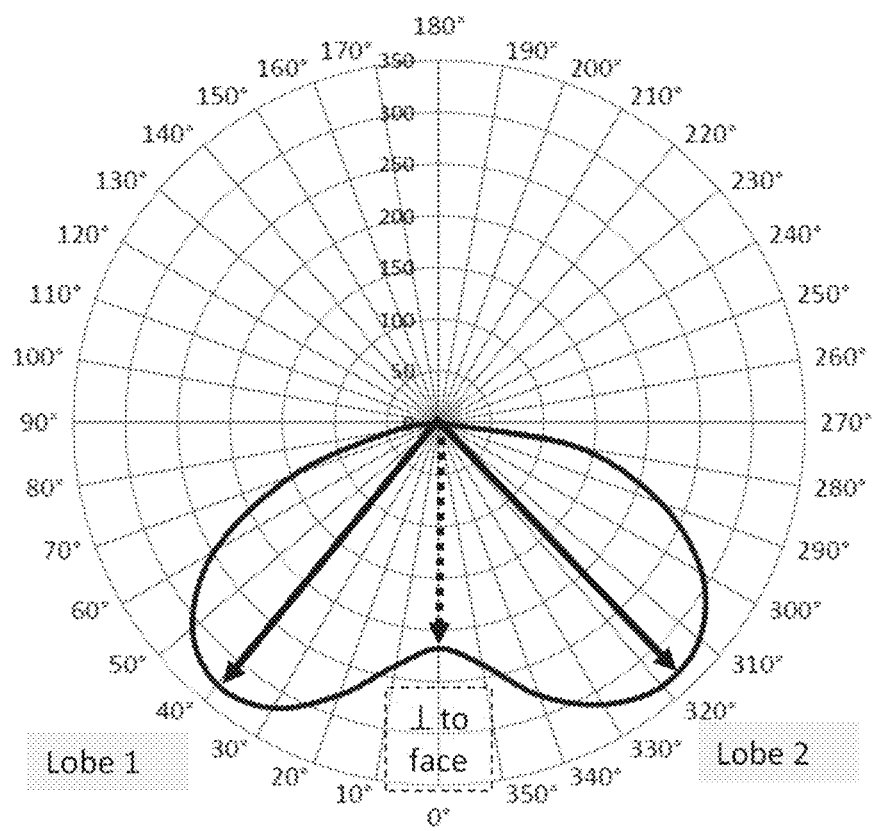
Fig. 12

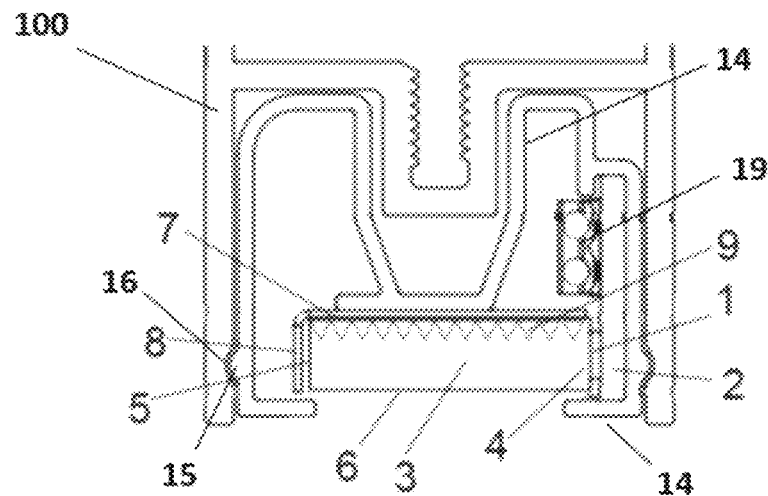
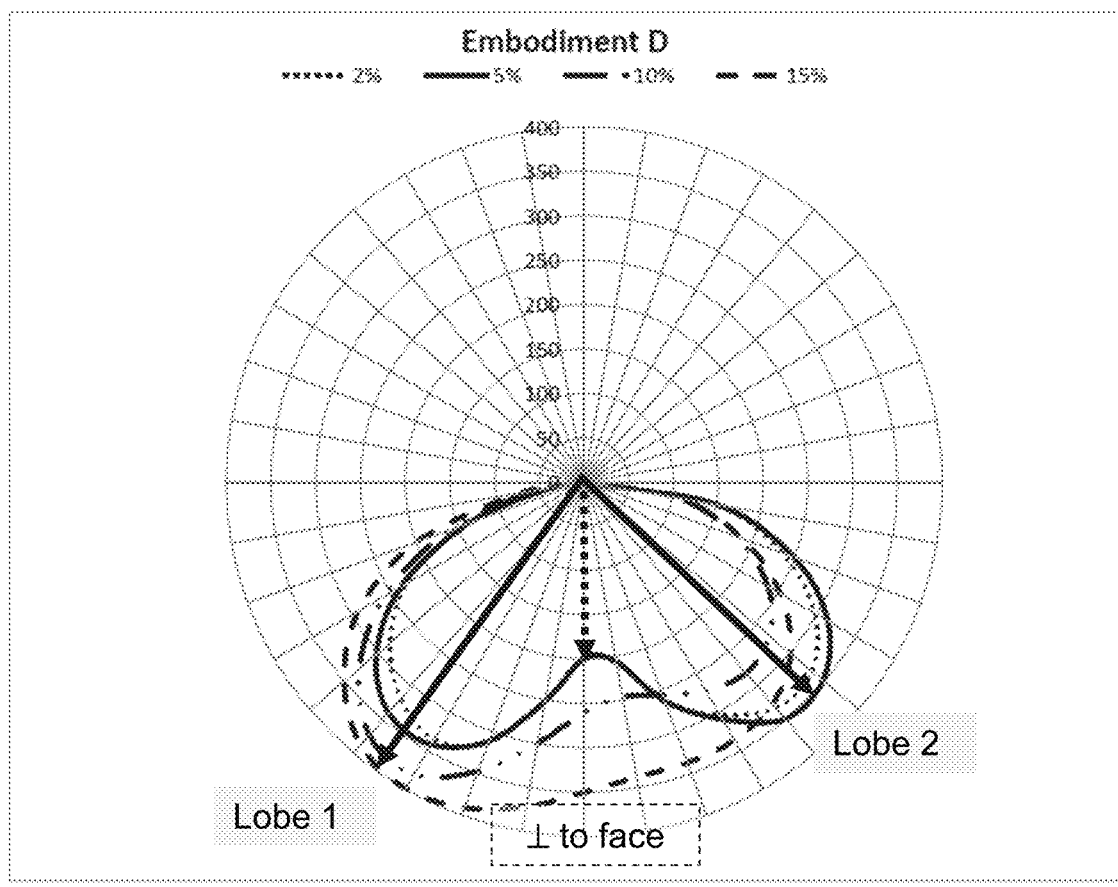
Fig. 13

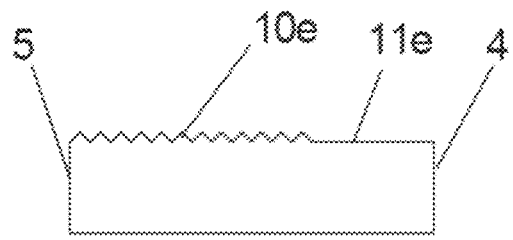
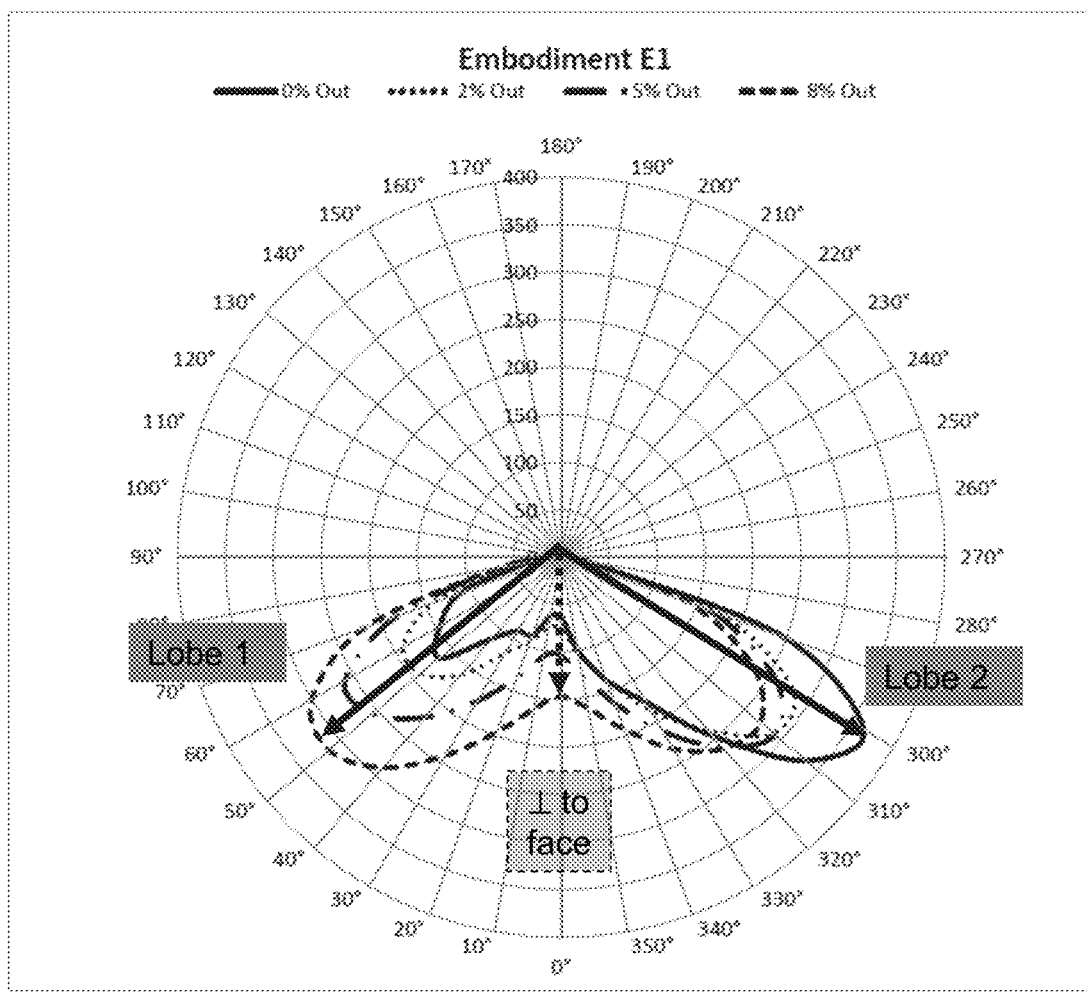
Fig. 14

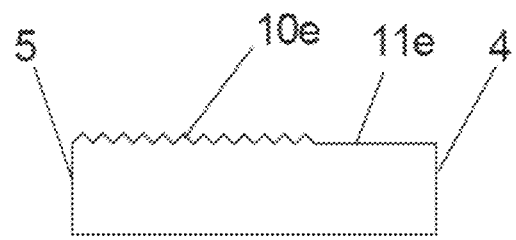
Embodiment E
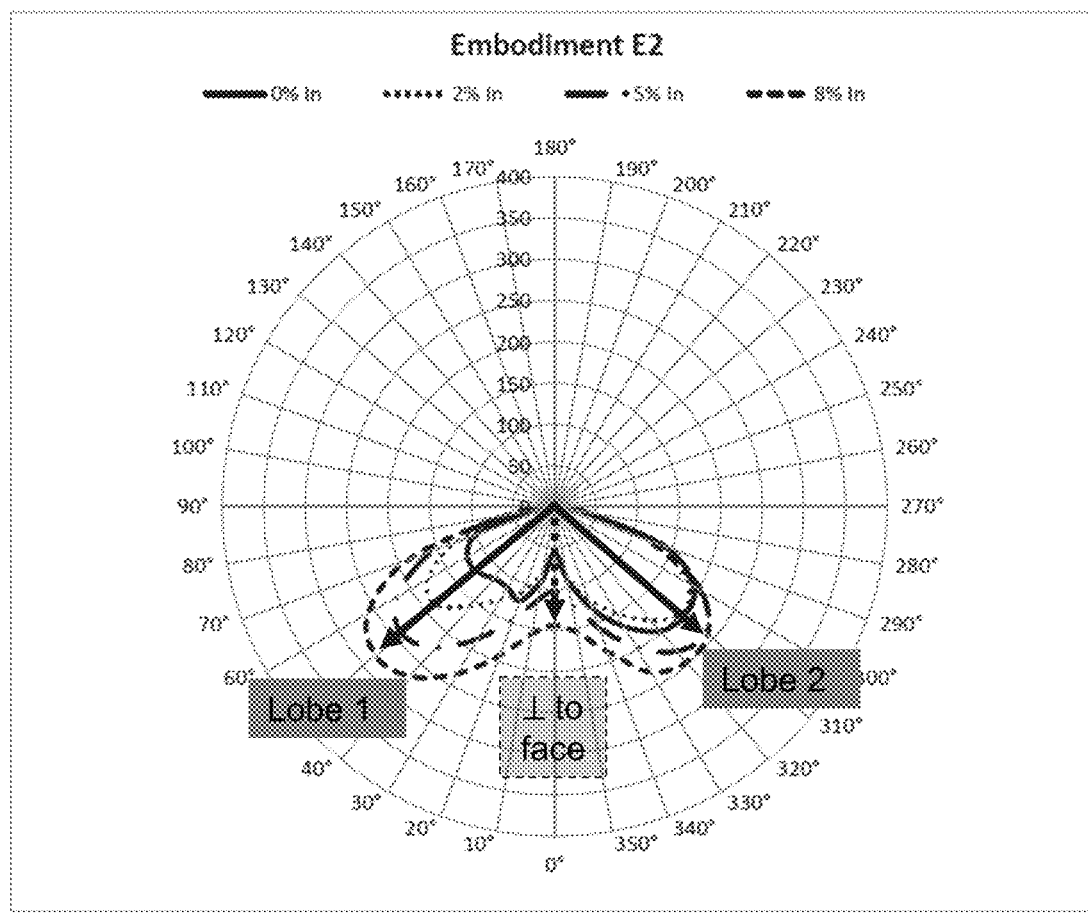
Fig. 15

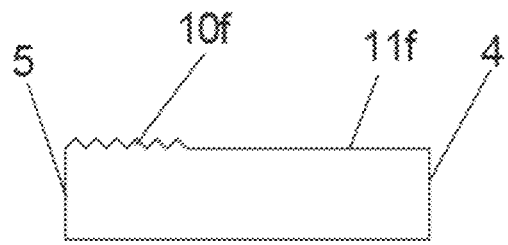
Embodiment F
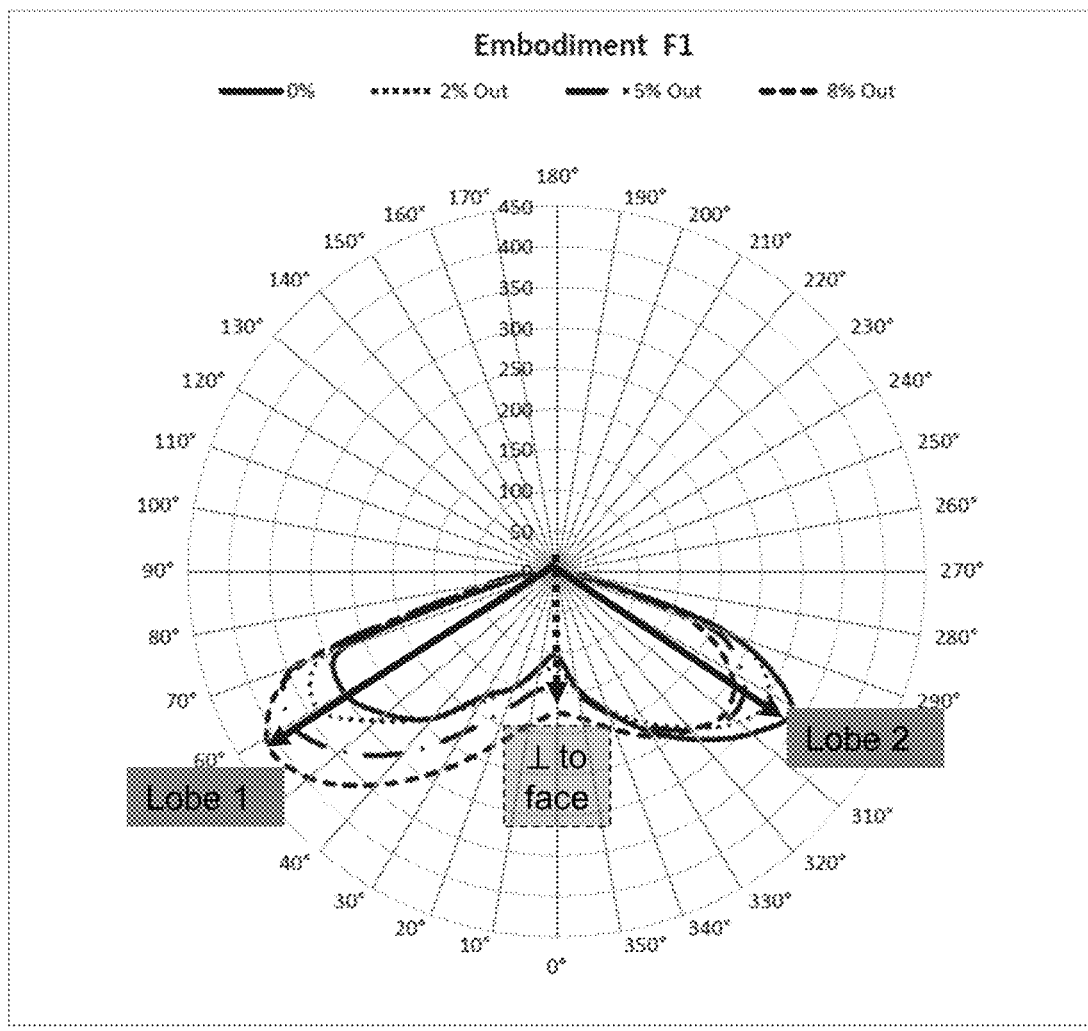
Fig. 16

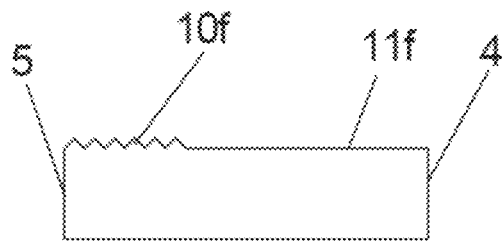
Embodiment F
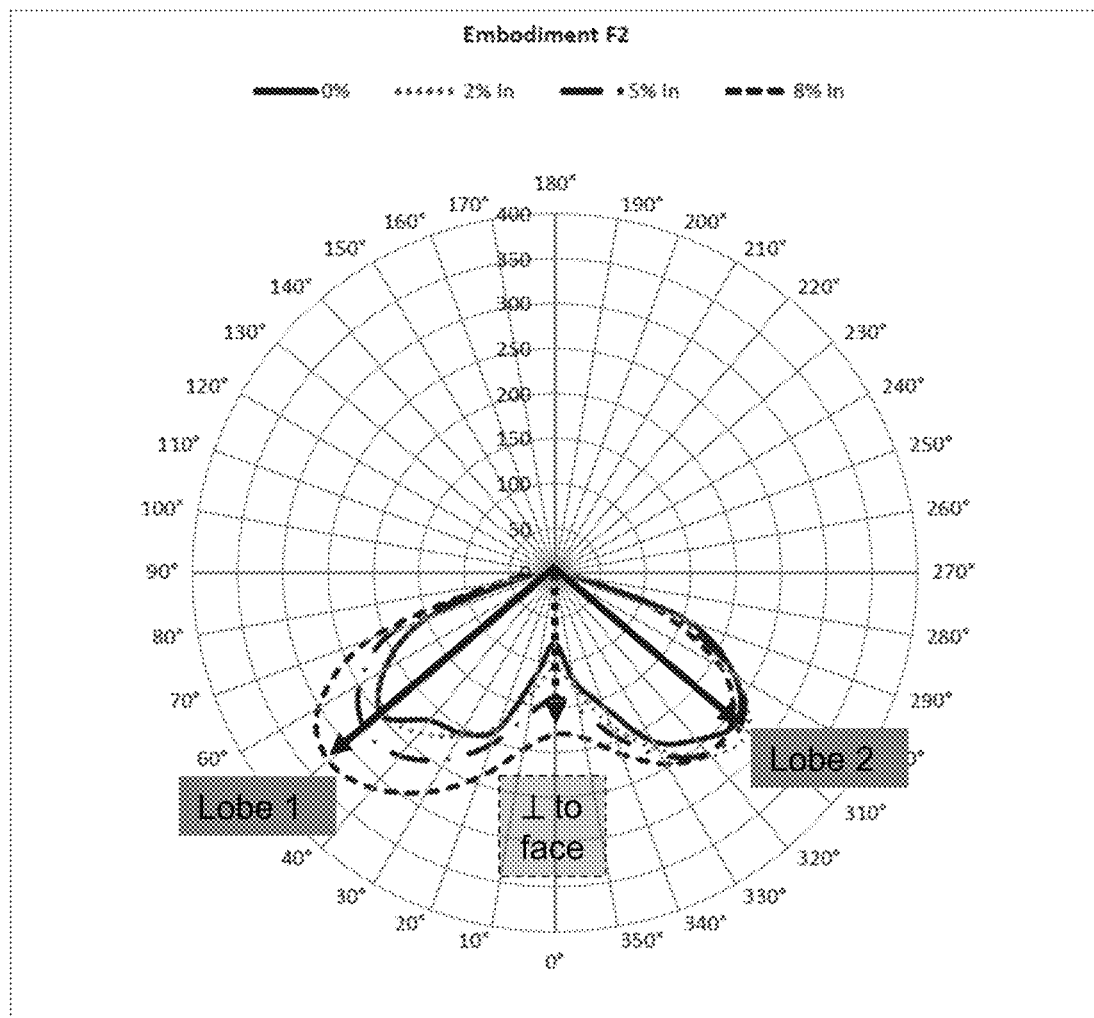
Fig. 17

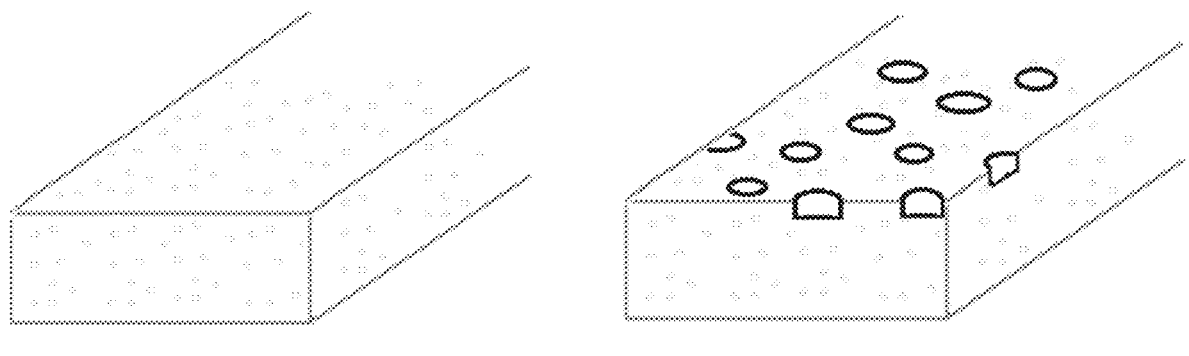
G10%  G10% Etched
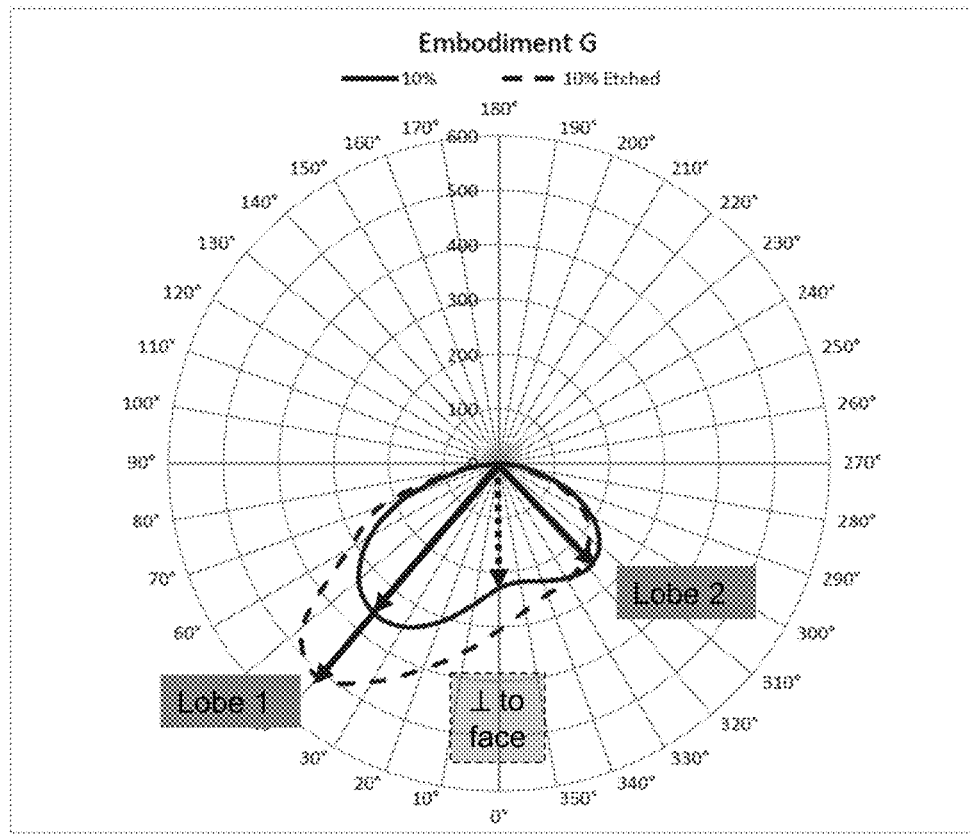
Fig. 18

Embodiment H with diffuse sawtooth embodiment
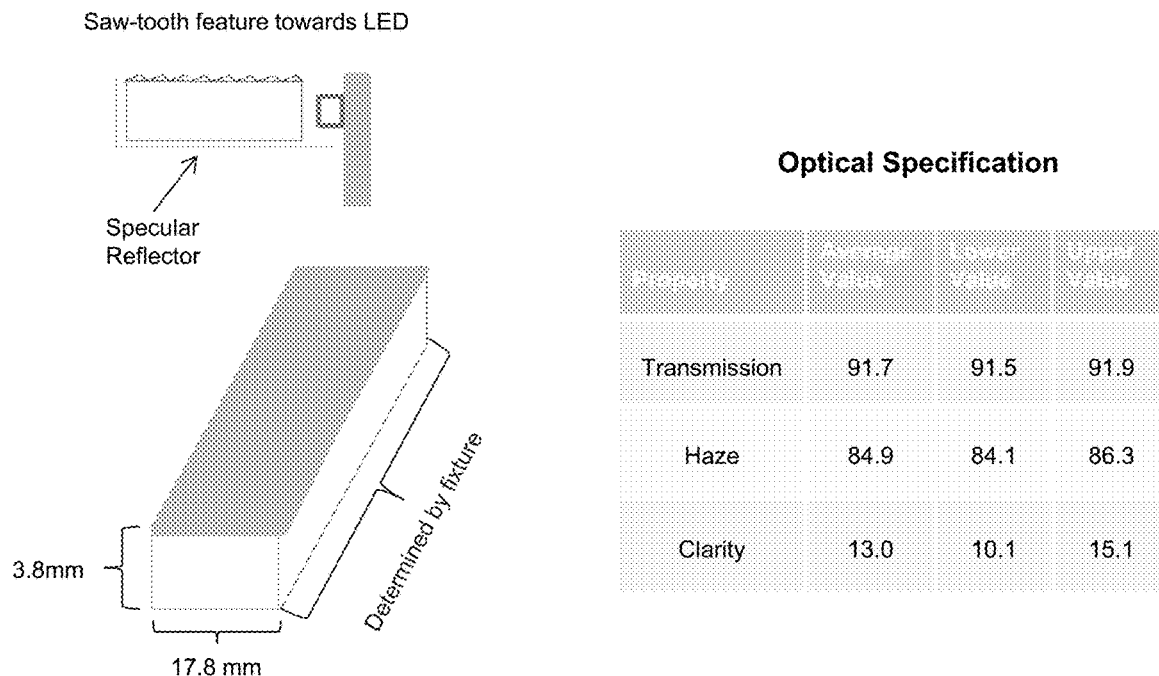
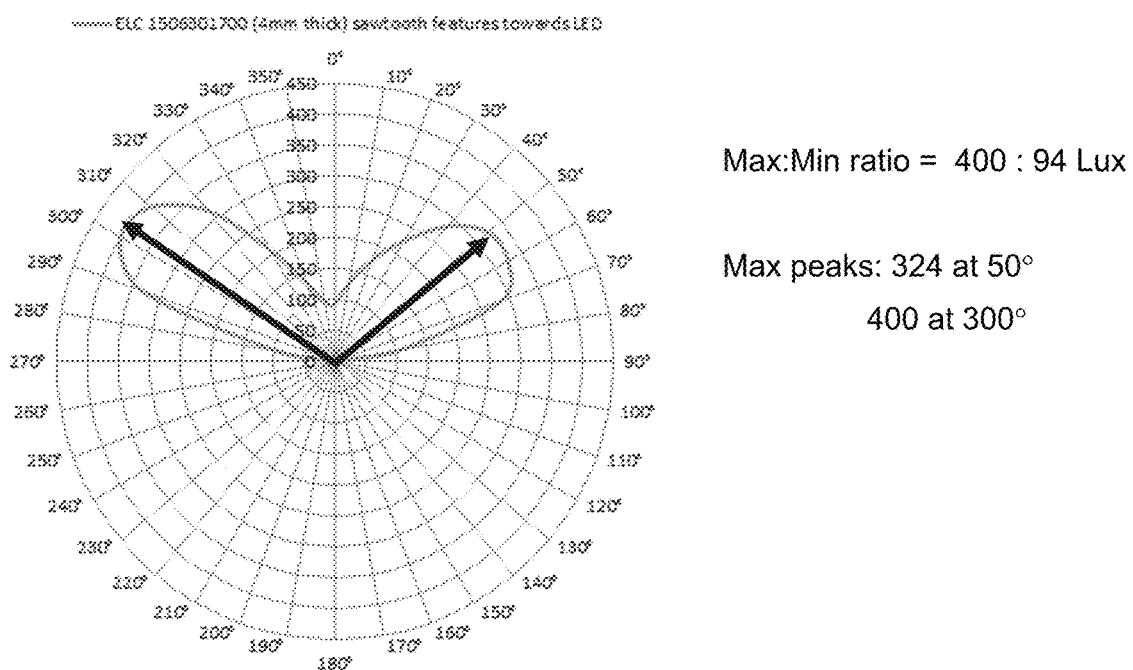
Max:Min ratio = 400 : 94 Lux
Max peaks: 324 at 50°
400 at 300°
Fig. 19A

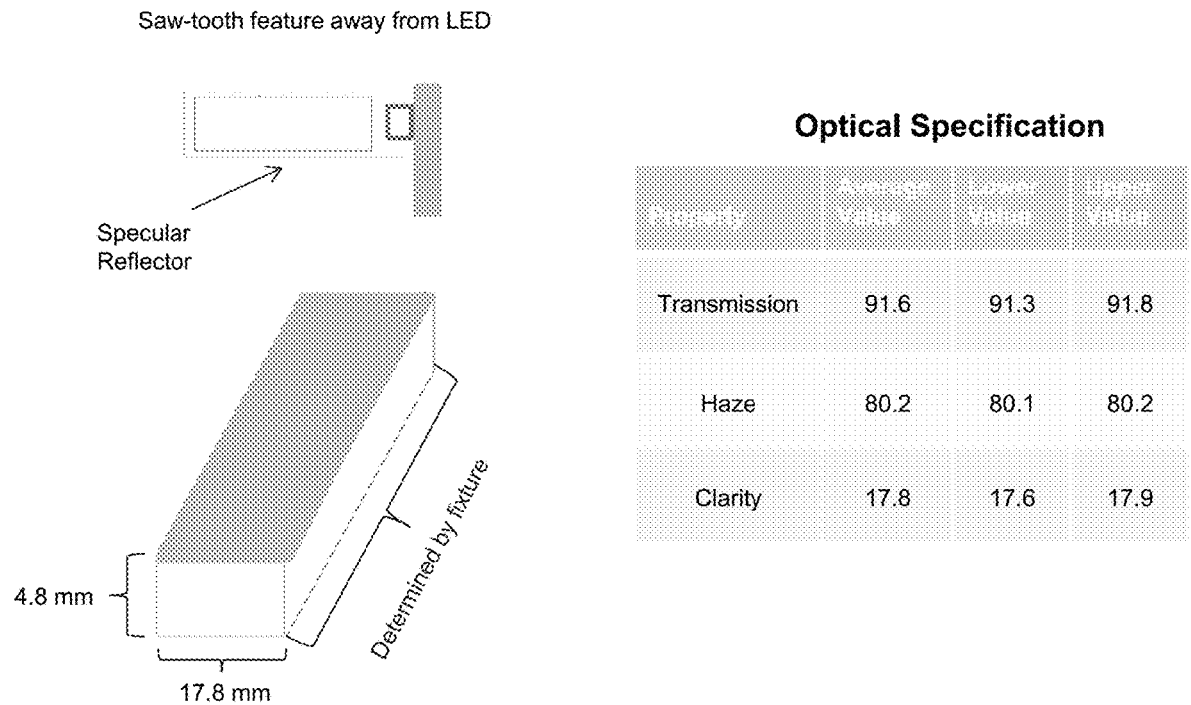
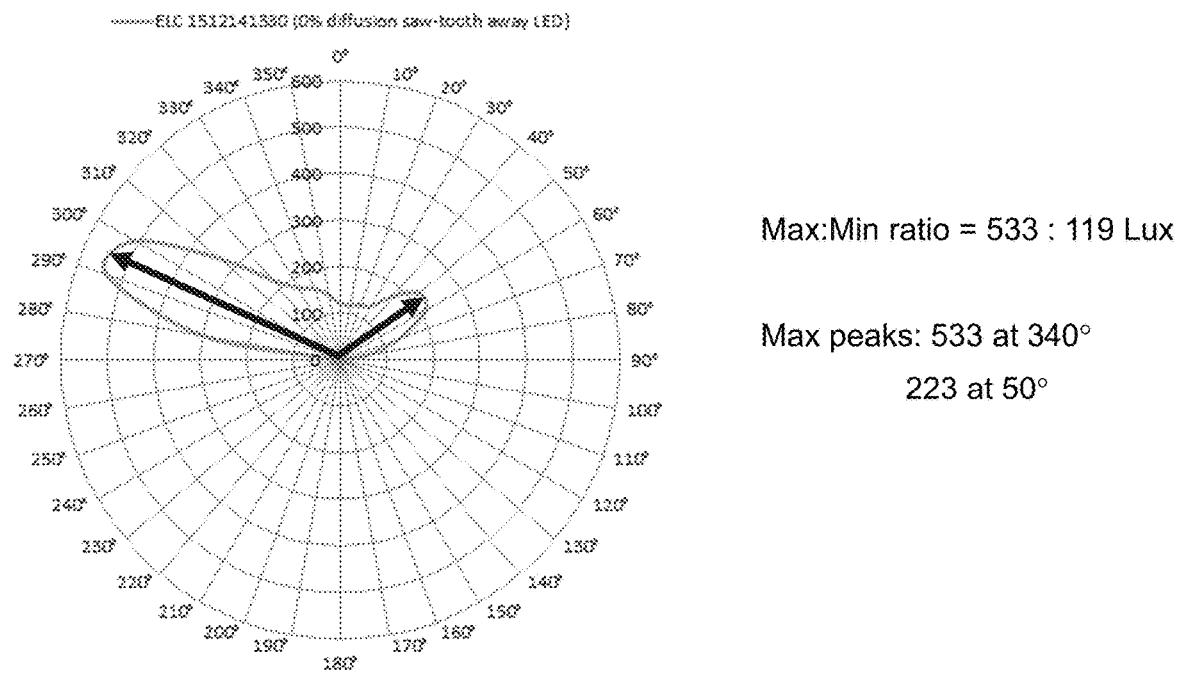
Fig. 19B

Embodiment I with diffuse planar embodiment
Diffuse layer 1110 light guide is 17.8 mm wide
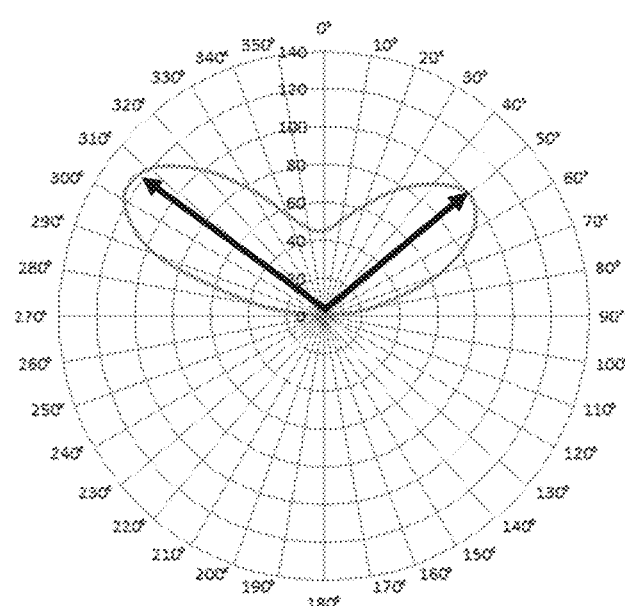
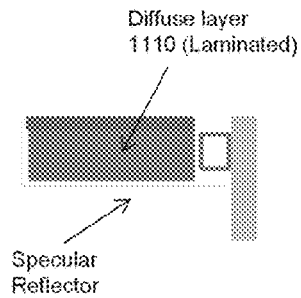
| Angle | 11.1 x 10.8 |
|---|---|
| Transmission | 91.5 |
| Haze | 86.3 |
| Clarity | 15.2 |
Fig. 20A
Diffuse layer 1515 light guide is 17.8 mm wide
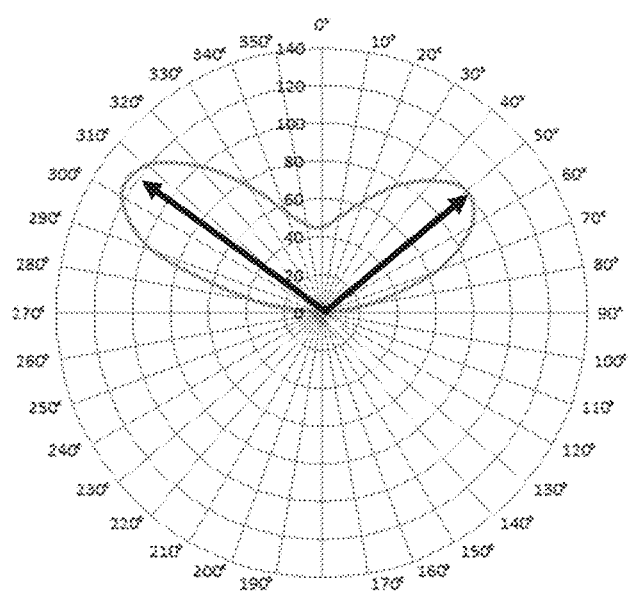
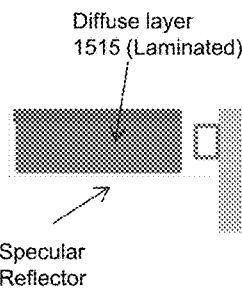
| Angle | 15.3 x 14.5 |
|---|---|
| Transmission | 90.2 |
| Haze | 90.6 |
| Clarity | 7.3 |
Fig. 20B

Diffuse layer 3030 light guide is 17.8 mm wide
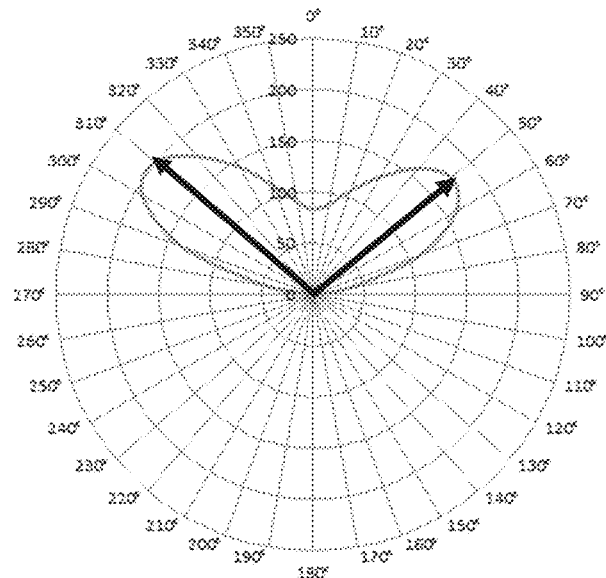
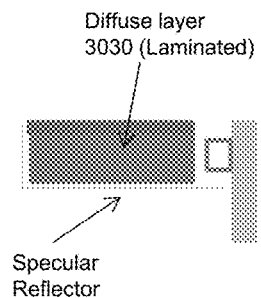
Diffuse layer 3030 (Laminated)
Specular Reflector
| Angle | 30.8 |
| | 27.7 |
| Transmission | 92.0 |
| Haze | 94.1 |
| Clarity | 3.9 |
Fig. 20C
Diffuse layer 4030 light guide is 17.8 mm wide
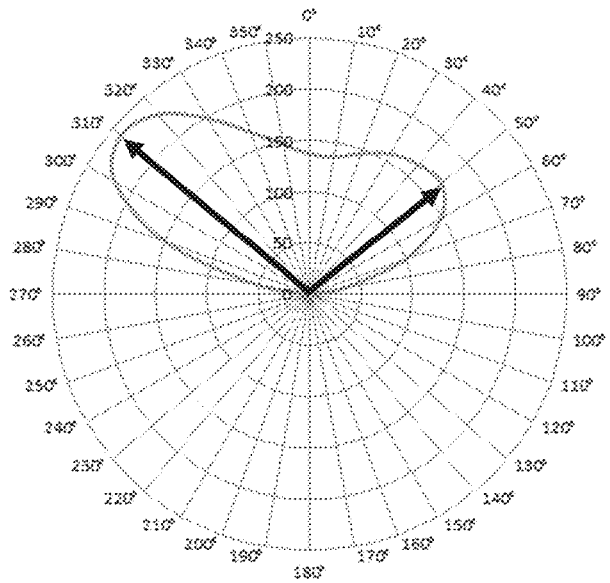
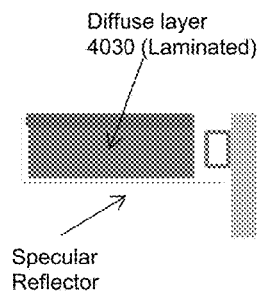
Diffuse layer 4030 (Laminated)
Specular Reflector
| Angle | 40.1 |
| | 30.1 |
| Transmission | 86.8 |
| Haze | 94.9 |
| Clarity | 5.6 |
Fig. 20D

|              |         |              | Lobe 1         |           |                          | ⊥ to Face      |           | Lobe 2         |           |                          |
|--------------|---------|--------------|----------------|-----------|--------------------------|----------------|-----------|----------------|-----------|--------------------------|
| Embodiment   | Figure  | Shape        | Angle (deg)    | Intensity | Lobe 1 to ⊥ % ratio      | Angle (deg)    | Intensity | Angle (deg)    | Intensity | Lobe 2 to ⊥ % ratio      |
| A1           | Fig. 10 | Asymmetric   | 68             | 760       | 292%                     | 0              | 260       | 40             | 390       | 150%                     |
| A2           | Fig. 8  | Batwing      | 38             | 500       | 208%                     | 0              | 240       | 43             | 500       | 208%                     |
| C2%          | Fig. 11 | Asym-Batwing | 38             | 330       | 152%                     | 0              | 150       | 42             | 225       | 150%                     |
| C5%          | Fig. 11 | Asym-Batwing | 40             | 345       | 230%                     | 0              | 150       | 42             | 225       | 150%                     |
| C10%         | Fig. 11 | Asym-Batwing | 40             | 355       | 158%                     | 0              | 225       | 40             | 250       | 111%                     |
| C20%         | Fig. 11 | Asym-Batwing | 40             | 360       | 120%                     | 0              | 300       | 40             | 250       | 83%                      |
| D            | Fig. 12 | Batwing      | 40             | 335       | 152%                     | 0              | 220       | 42             | 330       | 150%                     |
| E1-0%        | Fig. 14 | Asym-Batwing | 52             | 170       | 283%                     | 0              | 60        | 54             | 365       | 608%                     |
| E1-2%        | Fig. 14 | Asym-Batwing | 53             | 195       | 300%                     | 0              | 65        | 52             | 295       | 454%                     |
| E1-5%        | Fig. 14 | Asym-Batwing | 54             | 260       | 260%                     | 0              | 100       | 51             | 290       | 290%                     |
| E1-8%        | Fig. 14 | Asym-Batwing | 52             | 315       | 210%                     | 0              | 150       | 49             | 275       | 183%                     |
| E2-0%        | Fig. 15 | Batwing      | 50             | 120       | 218%                     | 0              | 55        | 42             | 200       | 364%                     |
| E2-2%        | Fig. 15 | Batwing      | 50             | 185       | 336%                     | 0              | 55        | 42             | 200       | 364%                     |
| E2-5%        | Fig. 15 | Batwing      | 50             | 245       | 233%                     | 0              | 105       | 39             | 290       | 276%                     |
| E2-8%        | Fig. 15 | Batwing      | 50             | 280       | 193%                     | 0              | 145       | 32             | 300       | 207%                     |
| F1-0%        | Fig. 16 | Wide Batwing | 60             | 300       | 286%                     | 0              | 105       | 58             | 335       | 319%                     |
| F1-2%        | Fig. 16 | Wide Batwing | 60             | 340       | 309%                     | 0              | 110       | 57             | 310       | 282%                     |
| F1-5%        | Fig. 16 | Wide Batwing | 59             | 375       | 268%                     | 0              | 140       | 56             | 275       | 196%                     |
| F1-8%        | Fig. 16 | Wide Batwing | 58             | 410       | 234%                     | 0              | 175       | 51             | 270       | 154%                     |
| F2-0%        | Fig. 17 | Batwing      | 50             | 250       | 313%                     | 0              | 80        | 50             | 260       | 325%                     |
| F2-2%        | Fig. 17 | Batwing      | 50             | 250       | 238%                     | 0              | 105       | 50             | 270       | 257%                     |
| F2-5%        | Fig. 17 | Batwing      | 50             | 275       | 196%                     | 0              | 140       | 49             | 260       | 186%                     |
| F2-8%        | Fig. 17 | Batwing      | 50             | 370       | 206%                     | 0              | 180       | 48             | 255       | 142%                     |
| G10%         | Fig. 18 | Asymmetric   | 40             | 355       | 158%                     | 0              | 225       | 43             | 240       | 107%                     |
| G10% Etched  | Fig. 18 | Asymmetric   | 40             | 505       | 168%                     | 0              | 300       | 43             | 235       | 78%                      |
| H1           | Fig. 19A| Batwing      | 58             | 400       | 400%                     | 0              | 100       | 50             | 330       | 330%                     |
| H2           | Fig. 19B| Asymmetric   | 65             | 550       | 458%                     | 0              | 120       | 51             | 220       | 183%                     |
| I1           | Fig. 20A| Batwing      | 52             | 122       | 265%                     | 0              | 46        | 50             | 100       | 217%                     |
| I2           | Fig. 20B| Batwing      | 53             | 122       | 290%                     | 0              | 42        | 50             | 100       | 238%                     |
| I3           | Fig. 20C| Batwing      | 50             | 200       | 250%                     | 0              | 80        | 50             | 170       | 213%                     |
| I4           | Fig. 20D| Asymmetric   | 50             | 240       | 171%                     | 0              | 140       | 50             | 165       | 118%                     |

Fig. 21

| Reflector | Reflectance | | | | | Yellowness Index |
|---|---|---|---|---|---|---|
| | Y(D65) | x(D65) | y(D65) | u'(D65) | v'(D65) | YI(E313-96)(D65) |
| Black Powder Coat SCI | 4.73 | 0.3112 | 0.3272 | 0.1975 | 0.4671 | -1.75 |
| Black Powder Coat SCE | 2.52 | 0.3074 | 0.3244 | 0.1958 | 0.465 | -5.64 |
| Specular Component (SCI - SCE) | 2.21 | 0.0038 | 0.0028 | 0.0017 | 0.0021 | 3.89 |
| White Powder Coat SCI | 83.07 | 0.3112 | 0.3281 | 0.1971 | 0.4676 | -1.48 |
| White Powder Coat SCE | 79.57 | 0.3114 | 0.3283 | 0.1972 | 0.4677 | -1.27 |
| Specular Component (SCI - SCE) | 3.5 | -0.0002 | -0.0002 | -1E-04 | -1E-04 | -0.21 |
| Gray Powder Coat SCI | 30.89 | 0.2981 | 0.3181 | 0.1917 | 0.4602 | -15.05 |
| Gray Powder Coat SCE | 29.77 | 0.2983 | 0.3182 | 0.1918 | 0.4603 | -14.84 |
| Specular Component (SCI - SCE) | 1.12 | -0.0002 | -0.0001 | -0.0001 | -0.0001 | 0.25 |
| White Reflector Film A SCI | 96.77 | 0.3117 | 0.3283 | 0.1974 | 0.4678 | -0.97 |
| White Reflector Film A SCE | 91.28 | 0.312 | 0.3286 | 0.1975 | 0.468 | -0.68 |
| Specular Component (SCI - SCE) | 5.49 | -0.0003 | -0.0003 | -0.0001 | -0.0002 | -0.29 |
| White Reflector Film B SCI | 96.55 | 0.3151 | 0.3326 | 0.1982 | 0.4706 | - |
| White Reflector Film B SCE | 89.51 | 0.3125 | 0.3292 | 0.1976 | 0.4684 | -0.11 |
| Specular Component (SCI - SCE) | 7.04 | 0.0026 | 0.0034 | 0.0006 | 0.0022 | - |
| White Reflector Film C matte side SCI | 95.77 | 0.3129 | 0.3302 | 0.1975 | 0.469 | 0.51 |
| White Reflector Film C matte side SCE | 93.8 | 0.3133 | 0.3305 | 0.1977 | 0.4692 | 0.92 |
| Specular Component (SCI - SCE) | 1.97 | -0.0004 | -0.0003 | -0.0002 | -0.0002 | -0.41 |
| White Reflector Film C gloss side SCI | 95.34 | 0.3131 | 0.3307 | 0.1975 | 0.4693 | 0.81 |
| White Reflector Film C gloss side SCE | 93.28 | 0.3131 | 0.3306 | 0.1975 | 0.4692 | 0.84 |
| Specular Component (SCI - SCE) | 2.06 | 0 | 1E-04 | 0 | 1E-04 | -0.03 |
| Specular Al reflector SCI | 93.6 | 0.3124 | 0.3288 | 0.1977 | 0.4682 | -0.31 |
| Specular Al reflector SCE | 5.12 | 0.3041 | 0.3116 | 0.1984 | 0.4574 | -13.09 |
| Specular Component (SCI - SCE) | 88.48 | 0.0083 | 0.0172 | -0.0007 | 0.0108 | 12.78 |

Fig. 23A

SINGLE EDGE LIT LIGHTING MODULE WITH BI-LOBED LIGHT DISTRIBUTION

RELATED APPLICATIONS

This application is a continuation in part of and claims the benefit of non-provisional utility application Ser. No. 17/501,840 titled "Single Edge Lit Lighting Module and Light Fixture Producing Tailored Light Distributions" filed Oct. 14, 2021 which is itself a continuation in part of and claims the benefit of non-provisional utility application Ser. No. 15/887,801 titled "Single Edge Lit Lighting Module Producing Tailored Light Distributions" filed Feb. 2, 2018 which itself claims the benefit of Provisional patent application Ser. No. 62/453,588 titled "Single Edge Lit Lighting Module Producing Tailored Light Distributions" filed Feb. 2, 2017.

BACKGROUND

The invention relates to edge lit light fixtures which can be used in a variety of illumination applications. In illumination applications in order to achieve more uniform lighting from a surface it is often desired or required to control the light distribution in such a way as to output light from the fixture face with a greater proportion of light in a non-normal orientation. A bi-lobed batwing type distribution, named for the wing like appearance when shown on a polar plot of intensity vs. angle, is one such light distribution commonly used in lighting to provide uniform floor and/or ceiling illumination with a minimal number of fixtures. For general area coverage, a symmetric batwing distribution with two equal lobes each with greater intensity than the normal illumination is typical. For other applications such as targeting light distribution of a down light towards or away from a wall or an uplight in a cove lighting application used to illuminate a ceiling, distributions with one "dominant" lobe with intensity greater than the normal is more desirable.

SUMMARY

A single edge lit lighting module is disclosed which produces tailored light distributions valuable in many illumination applications. The light distributions attainable using the invention include, but are not limited to, symmetric and asymmetric batwing distributions for downlighting and uplighting applications, asymmetric distributions for perimeter and cove lighting and symmetric distributions for task lighting. The invention's unique single edge lit constructions provide the means for achieving desired non-lambertian light distributions without need for conventional two lit edges, thereby economizing on light source components. Furthermore, unusually compact form factors with narrow width can be realized with the single edge lit constructions and these are particularly well-suited for linear lighting fixtures. Various embodiments also provide means for adjusting light distributions dynamically to control light output characteristics by controlling the input signals to the LED board included in the assembly. Also disclosed is the use of an additional light transmitting component over the face of the lighting module to act as the light fixture output face to protect the light scattering optical element surface or to further modify the light distribution characteristics.

BRIEF DESCRIPTION OF FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2B are isometric views of different embodiments of the light scattering optical element.

FIG. 2C shows configuration of optical testing for clarity, haze, and transmission light scattering properties.

FIG. 2D is a table of optical properties of different embodiments of light scattering optical element.

FIG. 3A, FIG. 3B and FIG. 3C combined are referred to as FIG. 3, a table listing some single edge lit lighting module embodiments and their key characteristics.

FIG. 4 illustrates various embodiment surface features.

FIG. 5 is a photograph of a cross-section of the embodiment A light scattering optical element zoomed in on the surface features.

FIG. 6 shows cross-section views of light scattering optical element configuration of embodiments E and F.

FIG. 12 is a polar plot demonstrating the cross-sectional angular output of embodiment module D showing symmetric batwing light distribution.

FIG. 13 is a polar plot demonstrating the cross-sectional angular output of embodiment module D with different diffusion levels.

FIG. 14 is a polar plot demonstrating the cross-sectional angular output of embodiment module E1 with 12-6 light scattering optical element surface pattern on output face.

FIG. 15 is a polar plot demonstrating the cross-sectional angular output of embodiment module E2 with 12-6 light scattering optical element surface pattern on inner face.

FIG. 16 is a polar plot demonstrating the cross-sectional angular output of embodiment module F1 with 6-12 light scattering optical element surface pattern on output face.

FIG. 17 is a polar plot demonstrating the cross-sectional angular output of embodiment module F2 with 6-12 light scattering optical element surface pattern on inner face.

FIG. 18 is a polar plot illustrating the increased cross-sectional asymmetric angular output of embodiment module G having an etched light scattering optical element surface.

FIG. 19A and FIG. 19B detail optical properties of diffuse sawtooth type light scattering optical elements and the photometric plots when used in a lighting module embodiment.

FIGS. 20A, B, C and D detail optical properties of diffuse layer type light scattering optical elements and the photometric plots when used in a lighting module embodiment.

FIG. 21 is a table summarizing the key optical measurements for each of the lighting module embodiments.

FIG. 23A is table of quantitative reflectance data for various reflectors used in embodiments

DETAILED DESCRIPTION

Figure 1A:
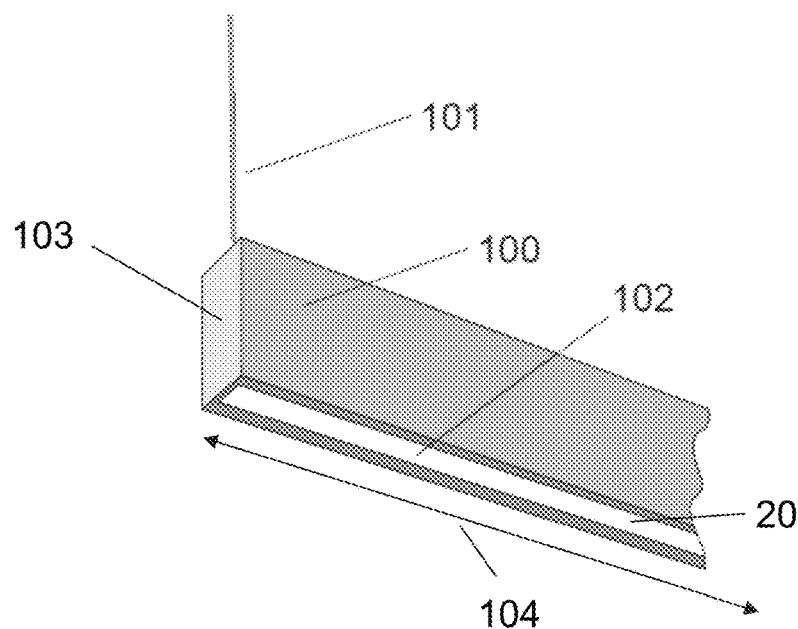
FIG. 1A is an isometric view of a light fixture with an embodiment lighting module.

FIG. 1A is an isometric view of an embodiment light fixture with an embodiment lighting module. The lighting module is contained within a housing 100 with end cap 103 and supported by a wire hanger 101. Light is transmitted from the fixture through a light fixture output face 102. This could be the output face of the lighting module or an optically transmitting component 20 positioned over the lighting module output face such as a cover lens or a glare control film. The cover lens may be comprised of a clear of diffuse optical material and may also have light redirecting surface features to help further shape the light output from the lighting module. The invention is particular well suited to linear lighting fixtures where the length 104 is required to be configurable. The light module embodiments disclosed can be comprised of materials that are extruded as profiles or sheets and this enables long lengths to be produced. Typically in linear lighting the fixtures might be 4 ft, 6 ft or 8 ft as standard lengths for suspended or surface mounting, but they may also be longer or required to be cut to a custom lengths. In the case of recessed downlights such as those used in ceiling grid systems the lengths are specific to the grid dimensions and would typically be at, or close to, 23.75", 47.75", 71.75" and 95.75" in order to fit between the T-Bar elements of the grid ceiling.

Figure 1B:
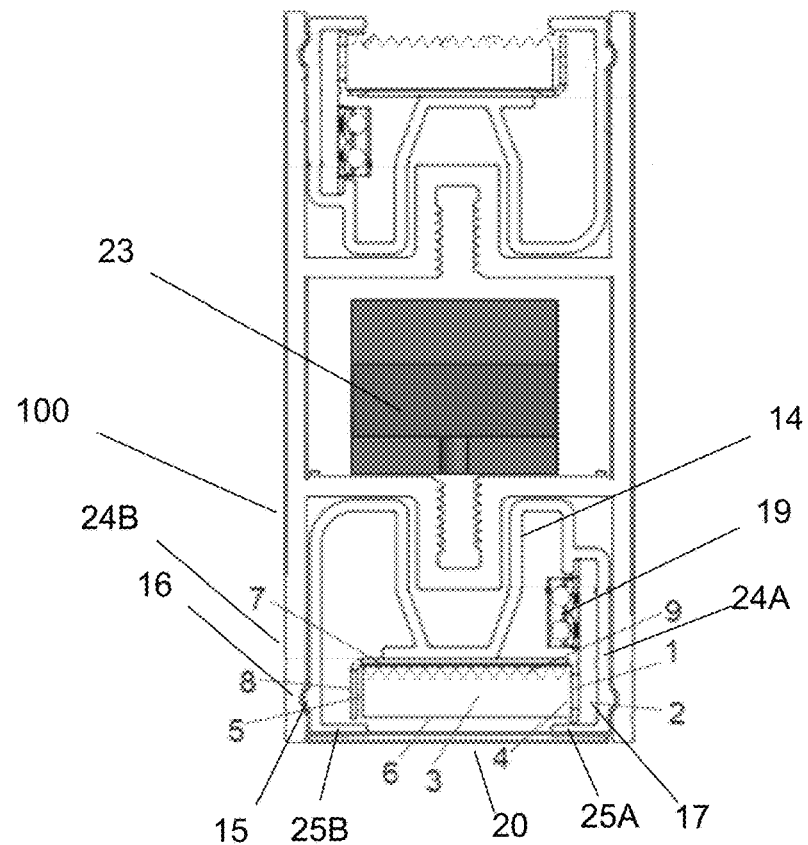
FIG. 1B is a cross sectional view of the light fixture with its end cap removed showing the embodiment lighting module enclosed within the fixture body.

FIG. 1B is a cross sectional view of the embodiment light fixture in FIG. 1A with the end cap 103 removed. The lighting module housing 14 is contained withing the light fixture housing 100 and comprises the light source, an LED board 2, consisting of individual light emitting diodes (LEDs) 1 mounted on a printed circuit board (PCB) 17 which supplies electrical power to the LEDs, which are arranged on the PCB in adjacent rows and positioned proximate to the light scattering optical element input face 4. The PCB also contains a surface mount electrical connector 19 which is able to receive wires from a driver or controller 23. Light emitted from the LEDs 1 enters the light scattering optical element through the light scattering optical element input face 4 and propagate through the light scattering optical element 3, partially internally reflecting from the faces of the light scattering optical element due to difference between the refractive index of the light scattering optical element and refractive difference of surrounding medium, typically air. Some light does not internally reflect at the surface but rather escapes from the output face 6, typically with a light distribution centered at an angle less than 90 degrees from the output surface 6 and tilted away from the input face. Light that propagates through the light scattering optical element and exits through a light scattering optical element opposing face 5 is reflected back into the light scattering optical element by the reflector 8, the light scattering optical element opposing face effectively becoming in function a light scattering optical element input face. The reflector 8 wraps around both the light scattering optical element opposing face 5 and light scattering optical element inner face 7. Light that escapes the light scattering optical element 3 through the inner face 7 is reflected back into the light scattering optical element 3. For a reflector that is a specular reflector, light reflects back towards the light scattering optical element at the same angle from normal as light incident onto the reflector. Reflectors with a component of diffuse reflectance will produce more light scattering and a more dispersed light reflection. Further, an optically transmitting component 20 is optionally positioned over the lighting module output face. The function of the optically transmitting component may be to protect the surface of the light scattering optical element and seal it from moisture, chemicals or dust, to provide a different surface aesthetic to aid the overall look of the light fixture, or it may be used to change the lighting distribution before it exits the light fixture output face. Specific embodiments of a light transmitting component 20 are a cover lens or a glare control film to act as the output face 102 of the light fixture. As alternative arrangements, the optically transmitting component 20 may also be held in place by the lighting module housing 14 or light fixture housing 100. The optically transmitting component 20 may be a clear cover lens or filter, a volumetric scattering or surface relief diffuser, refractive lens or light control film. If the diffuser is a strong diffuser with high levels of light scattering such as high haze and low clarity or a lambertian diffuser then the output of the lighting module will become more rounded, less bi-lobed and similarly closer to lambertian. If the diffuser has a higher clarity and low haze then the bi-lobed angular characteristic of the lighting module will be preserved. Another benefit of a diffuser is that it will help improve uniformity of the light emitting surface and smooth out any small variations in intensity or color in the projected lighting distribution. If the diffuser has surface relief refractive features or if a refractive lens or light control film is used it is possible to alter the angles of the lobes and the overall shape of the lighting distributions. It is also possible to design the light fixture or lighting module housing so the optically transmissive component is removable and interchangeable with a different optically transmissive component. This enables light distributions to easily be improved and changed in the field after the light fixture has been installed. This is useful to avoid cost and time required to return to the factory and deliver a replacement. Optically transmissive components can be easily manufactured using techniques such as profile, sheet or film extrusion, continuous film or sheet casting, injection or compression molding, application of additional coatings, and embossing of optical films. Typically, materials used to manufacture optically transmitting components include glass and optically transmissive plastics such as silicones, PMMA (polymethyl methacrylate), polycarbonate, PET, COC and polystyrene. It is obvious to those skilled in the art that alternative production methods would yield similar results. For instance, if the optically transmitting component were made to the same dimensions and design and using similar materials in a film or sheet extrusion process or a continuous polymer casting process the optical performance of the optically transmitting component would be operationally similar.

The design of the lighting module housing 14 is important to the invention as it protects and holds all the key components of the lighting module in alignment as well as providing a means to support electrical wiring and connections. The lighting module housing comprises a side wall portions 24A and 24B and a supporting ledges 25A and 25B that are orthogonal extension of the side wall portion; wherein the supporting ledge 25A supports the light scattering optical element and holds the LED board in a position in alignment with the light scattering optical element input face. Supporting ledge 25B supports the reflector and/or light scattering optical element. As configured in the particular embodiment of FIG. 1B, the supporting ledge 25A extends further past the input face 4 of the light scattering optical element than the supporting ledge 25B extends past the opposing face 5 of the light scattering optical element. This is too lessen the appearance of a bright "hotspot" region near the input face and improve brightness uniformity appearance. Without the extension of the supporting ledge 24A the illuminated surface of the light scattering optical element would be considerably less uniform with hotspotting and headlamping and would like be considered unacceptable for many direct view lighting applications. The inside surfaces of lighting module housing may also be coated with a highly reflective paint, such as a high brightness white powder coated paint, or some other reflective material that can be applied. Such a coating may be used in place of reflector components described in lighting module embodiments.

In the embodiment of FIG. 1B, both the light fixture housing 100, and the lighting module 14 are linear profile extrusions. Typically, light fixture end caps 103 are fitted with the light fixture housing 100 to cover and enclose the ends of the light fixture. The linear profile geometry of the lighting module housing and light fixture housing are well suited for manufacture by extrusion can be cut to length to produce light fixtures of various specified length. These extrusions are typically made from aluminum or some other rigid extrudable material such as metal or plastic. The three dimensional form is that of a 2 dimensional cross-sectional profile area extruded linearly in perpendicular direction. The lighting module 14 is further designed to be removable and to snap into the light fixture housing 100 and is held in place by a linear bump 15 on its sides that locates into a linear notch 16 in the light fixture housing 100. Alternatively, the light fixture housing could have a linear bump that mates with a linear notch in the lighting module housing to create a "push fit" for insertion and removal and a means to hold the module in place during normal operation of the light fixture. In either case the side portions the lighting housing module are flexed inward as the lighting module housing is inserted into or removed from the lighting housing. In alternative embodiments, other components and configurations can be used to position, fasten, insert, and remove a lighting module within a light fixture housing. Examples include but are not limited to Velcro, screws, clips, springs, and magnetic components.

In alternative embodiments, the lighting module housing is not removable but rather is integrated into the lighting fixture housing and the light fixture housing can be configured to incorporate the required features of the lighting module housing to directly assemble, hold, and position the linear lighting module components within the light fixture. It is also possible to use two lighting module housings in the same light fixture housing or configure the light fixture housing to integrate the features of the two lighting module housings. The purpose of two lighting modules may be to provide both direct downlighting to the room below and indirect uplighting of the ceiling above from the same fixture, either at the same time or to be controlled independently. The proportion of direct and indirect light from the two module arrangement can be controlled by selectively applying power to each module in a predetermined ratio. Two lighting modules would also be able to provide two forms of lateral or sideways light output from a light fixture. This might be useful in a vertical wall mounted application or for illuminating corridors or aisles in a retail display environment such as a supermarket.

Figure 2A:
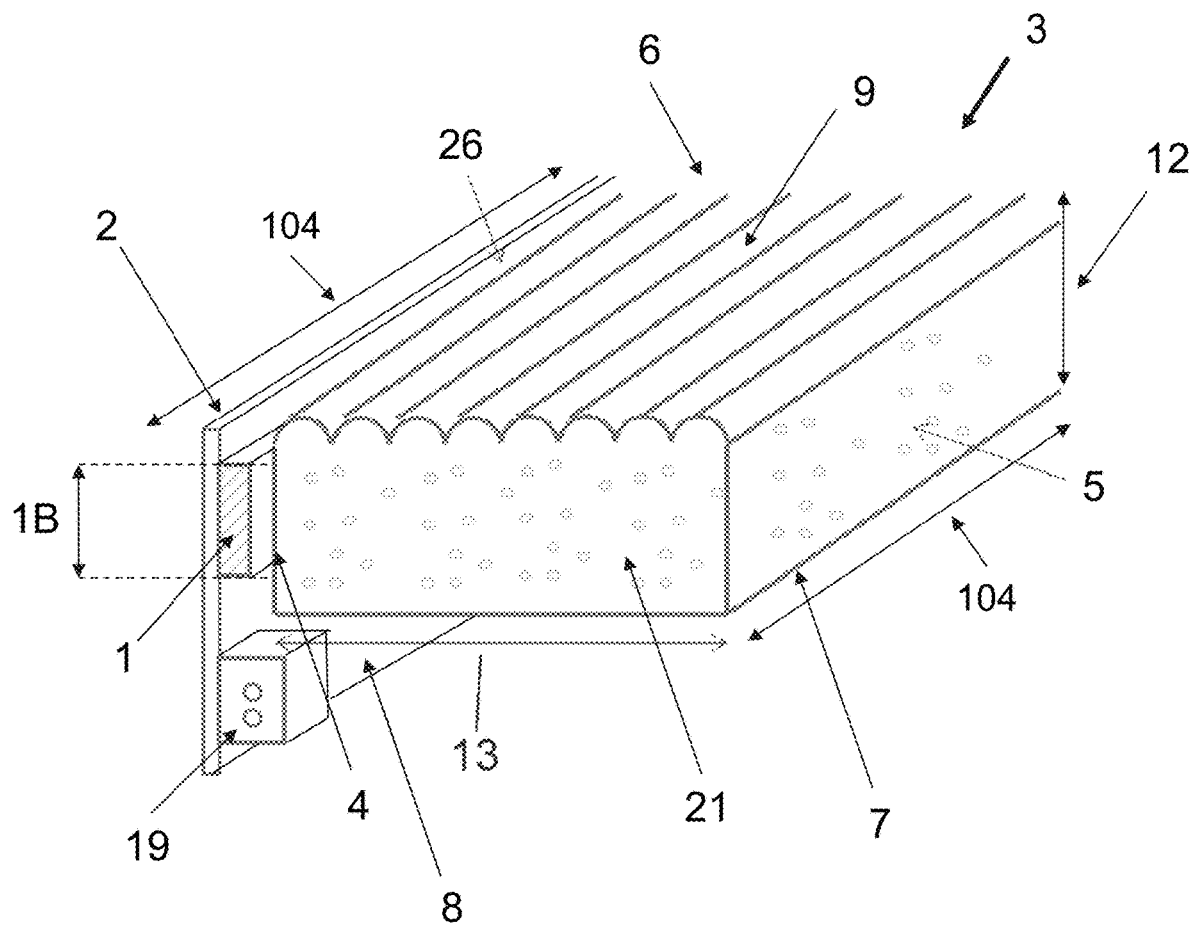
FIG. 2A is an isometric view of a light scattering optical element with LED board illustrating key design elements.

FIG. 2A is an isometric view of a planar embodiment of the light scattering optical element with an LED board 2 on which are mounted one or more LEDs 1 in strings or rows and an electrical connector 19 which is typically positioned below the line of the LEDs, although in other embodiments the connectors could be in line with the LEDs. The LED board 2 of predetermined length 104 and LED 1 is positioned proximate to input face 4 of the light scattering optical element of predetermined length 104 with a small air gap 26. Typically the length of the LED board and the light scattering optical element are comparable but that may not always be the case. For instance the LED board might be of a slightly longer length in order to position the electrical connector 19 in an end cap so as to help with electrical wiring to the power supply or driver. Important to various embodiments are dimensions of width and height. The LED 1 is positioned centrally on the input face 4 and the height of the light scattering optical element is chosen such that its height is greater than the height of the LED 1. For optimum performance and increased efficiency it is desirable to have a highly reflective white solder mask on the LED board surface 8. Height of light scattering optical element is typically 30%-100% taller than LED height, with the optimum for alignment in slim designs being about 50%. This is to ensure that the majority of light from the LED emitting surface is directing towards the input face. For example if the LED height is 3.0 mm the chosen height of the light scattering optical element is 3.9 mm-6.0 mm with an optimum choice of 4.5 mm and vice versa. For typical indoor lighting applications LED the LED would be a full spectrum white color with CCT in range of 2200 to 5000K and CRI in range of 80 to 95. It's also possible to achieve tunable white and color mixing of red, green and blue LEDs by configuring the LED board appropriately. LED height in embodiments is 3.0 mm for example 5630 or 3030 package chosen because these are most popular mid-power LED package for indoor lighting and typically deliver 25-100 lumens per package. Typically indoor linear lighting applications require 350-1000 lumens per foot and as a result a density of 12-48 LEDs per foot are used. For edge lighting it is important to have the LEDs spaced close together to avoid hotspots and as a result the density of LEDs would be 36 or 48 LEDs per foot and in cases where there is a requirement for tunable white the density might be as high as 96 LEDs per foot (eg 2 channels of 48 LEDs per foot). The width of the light scattering optical element 13 is typically chosen to be less than a few inches and can be adjusted depending upon the lighting distributions required from its output face 6. Volumetric light scattering is also an important variable in effecting light diffusing properties that influence the amount of outcoupling from the light scattering optical element as light passes between the input face 4 and the opposing face 5. Volumetric light scattering is produced by dispersed light scattering regions 21 within the light scattering optical element having transparent particles of typical size of between lum and 50 um with a refractive index different than the bulk matrix material. Similar effects can be achieve by particles or powders that are reflective such as TiO2. By controlling the configuration and concentration of the particles within the light scattering regions it is possible to control the peak intensity as well as the shape and spread of angular light distribution in each lobe, and the symmetry of the beam pattern. Concentration of particles in light scattering regions and the configuration of those regions can be controlled in the manufacturing process used to produce the light scattering optical elements are typically made from a high clarity optically transmissive material such as glass or an optical polymer such as optically clear versions of PMMA (polymethylacrylate) or PC (polycarbonate) resins. When the light scattering optical element is made from PMMA using polymer film, sheet, or profile extrusion, injection molding or continuous casting or cell casting techniques can be use. One method for incorporating the light scattering regions 21 of FIG. 2 into the bulk optically transmissive material is to include microbeads of differing refractive index than the bulk optically transmissive material into the bulk material as it is being initially processed or as a layer or co-extrusion or to include a commercially available diffusion resin in the light scattering optical element formulation. The microbeads can also be included in a film layer or thin clear surface coating that is laminated, adhered or otherwise applied to the bulk material surface after the production of the bulk material. In certain embodiments disclosed the light scattering regions are in the form of a layer applied as a solvent or adhesive laminated film in the thickness range of 50 um to 500 um. In other embodiments the light scattering layer is a applied as a UV cured acrylic surface coating in the thickness range of 25 um to 250 um. Alternative means in creating dispersed regions of differing refractive index from the light scattering optical element matrix material include dosing microbeads into the light scattering optical element resin formulation as well as forming second phase regions in situ during by fluid phase mixing of immiscible blends of polymers. In addition to refractive index, the quantity per volume, size, and shape of dispersed regions effect light scattering properties. In the case of immiscible blends formed by fluid phase mixing, the shape of second phase regions may be other that spherical, for example oblate paraboloid, thereby generating non-symmetric light scattering. Processes for fabricating light scattering optical elements in this manner include extrusion, casting, and injection molding. Surface features 6, such as a lenticular pattern 9, and their pattern of arrangement on a face of the light scattering optical element, and the amount of the face which is covered by the surface features are also of importance in converting internal reflection within the light scattering optical element to output from the module at desired angular light distribution.

FIG. 2B details isometric views of various light scattering optical elements based upon the key elements detailed in FIG. 2A. Light scattering optical elements produced and tested included planar light scattering optical elements with no surface features and planar light scattering optical elements with surface features. Planar light scattering optical elements with surface features also had different feature shapes and varying patterns. Diffuse planar light scattering optical elements are categorically defined as light scattering optical elements without surface features but it should be clarified that at a small scale it there are dispersed patterns of small surface protrusions and indentations corresponding to light scattering particles within the light scattering optical element that are at or near the surface. In some embodiments this can be noticeably apparent by a matte finish of reduced gloss and can be quantitatively measured with a gloss meter. It is within the scope of the invention to add matting agents to the light scattering optical element formulation to reduce the smoothness or gloss of a light scattering optical element face to increase light extraction. Light scattering optical elements were produced in PMMA using profile extrusion, lamination and coating techniques. Surface patterns were produced using in-line tooling or using a secondary process step using a laser engraving equipment. Light scattering optical elements or optically transmissive bulk materials used to support layers or coatings can be produced using continuous extrusion and casting techniques either at the correct width and dimensions and subsequently cut to length or they can be processed in larger area sheet form and cut to size using typical processes suitable for cutting plastics such as a CNC router, laser cutter or table saw. In the case of coating being used to manufacture the light scattering optical element the sheet might be as large, or larger than, 96"×48" and the light scattering optical element can be cut into thin strips of 96" length for use in linear light fixtures or into shapes such as circles, rings or squares. It is obvious to those skilled in the art that alternative production methods would yield similar results. For instance, if the light scattering optical elements were made to the same optical properties, dimensions and design and using similar materials in a film or sheet extrusion process or a continuous or cell cast polymer casting process or using an injection molding techniques the optical performance of the light scattering optical elements would be operationally similar.

FIG. 2C shows configuration of optical testing for clarity, haze, and transmission light scattering properties. Clarity is a measurement of narrow angle scattering and is a standardized characterization of the translucence or "see-through" property of an optically transmissive component. It is a standard measurement on BYK Haze-gard Plus equipment as an added measurement to the ASTM D1003 test method configuration established for transmittance and haze. The clarity test configuration as shown in FIG. 2C shows the lens 30 which collimates light from the light source 31 that projects through the sample 32 and subsequently through the port 33 of the integrating sphere 34 and toward the sensor module 35. The center sensor 36 measures the center intensity $I_C$ and the off axis ring sensor 37 detects the narrow angle scatter as ring intensity $I_R$. The calculated clarity formula is $100\% \times ((I_C - I_R)/(I_C + I_R))$ wherein 100% indicates no scatter and 0% indicates narrow angle scatter equivalent to the center intensity which is an indication of complete loss of beam focus. Typically the measurement is taken through the thickness or cross sectional height of a sample. In the case of an edgelit optical element this is not the same optical path as the component in use but provides a feasible characterization of light scattering intensity that can be correlated with the magnitude and angular orientation of light outcoupling and the overall output light distribution from an edgelit optical element.

FIG. 2D provides a table of the optical properties of various embodiments of light scattering optical elements. Included in the table for comparison is data representative of typical light guides used in display and signage applications. Light guides ideally have high optical transmission, high clarity and low haze. Light guides also typically have surfaces that are high gloss in order to help with the total internal reflection (TIR) process. In comparison, all the embodiments of the light scattering optical elements are shown to have significantly different optical properties, namely low clarity, high haze and low gloss. Light scattering measurements of full width half maximum (FWHM) were done on test equipment using a green 532 nm laser projected normally into a sample face with the scattered light from the opposing side measured.

FIG. 3A, FIG. 3B and FIG. 3C combined are referred to as FIG. 3, a table listing some single edge lit lighting module embodiments and their key characteristics differentiating characteristics of light scattering optical element orientation, light scattering optical element height, light scattering optical element width, light scattering optical element surface feature geometry, bulk diffusion concentration, and reflector type.

FIG. 4 illustrates example embodiment surface patterns that have been developed to generate alternative beam output light distributions from light scattering optical element embodiments. These vary in both surface feature 9 size and shape as well as spacing of flat gaps between features and are labeled as SP1, SP2, SP3, SP4, and SP5. Alternative embodiments may utilize any variety of surface features that can be feasibly fabricated. Extrusion is a process in which lengths of light scattering optical element can be feasibly produced with patterns linear in the length dimension. In this case, prisms and lenticular designs can be readily produced. Asymmetric patterns including linear prisms with cross-sectional geometry of sawtooth triangles are also useful embodiments.

FIG. 5 is a photograph of a cross-section of the embodiment A light scattering optical element 3 zoomed in on the surface features 9 viewed against an air 26 background. The features are fundamentally triangular prism lenticular with sides of the triangle being slightly concave. In this embodiment the peaks of the surface features are sharper than the troughs which are more rounded.

FIG. 6 shows cross-section views of light scattering optical element configuration of embodiments E and F. The width of each light scattering optical element is 18 mm with 4.5 mm height. In embodiment E the first 6 mm of light scattering optical element surface adjacent to the input surface 4 has a flat surface and the next 12 mm of light scattering optical element surface 11e has a lenticular pattern 10e extending to the light scattering optical element opposing face 5.

Figure 7:
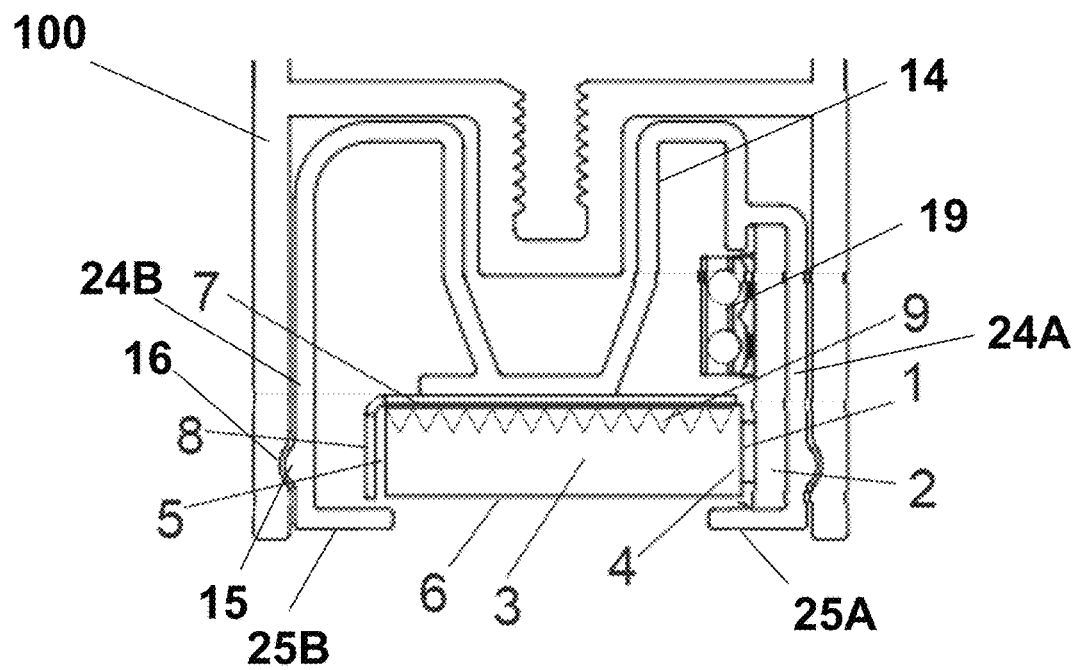
FIG. 7 is a cross-section view of lighting module embodiment A2.

FIG. 7 is a cross sectional view of lighting module embodiment A2. The lighting module housing 14 is contained withing the light fixture housing 100 and comprises the LED board 2 consisting of individual light emitting diodes (LEDs) 1 which is positioned adjacent to the light scattering optical element 3. Typically, the light scattering optical element height or thickness is chosen to be greater than the height of the LED 1 which is aligned central to the light scattering optical element input face 4, both are chosen for the purpose of maximizing the light inputted into the light scattering optical element. A typical light scattering optical element height used is 4.5 mm to 5 mm, and a typical mid-power LED package size is 2.8 mm×3.5 mm (2835), 3.0 mm×3.0 mm (3030) or 5.6 mm×3.0 mm (5630). Changing the thickness of the light scattering optical element and the positioning of the LED relative to the center of the light scattering optical element input face can also be used to control light distributions. Light emitted from the LEDs 1 enters the light scattering optical element through the light scattering optical element input face 4 and propagates through the light scattering optical element 3, partially internally reflecting from the faces of the light scattering optical element due to difference between the refractive index of the light scattering optical element and refractive difference of surrounding medium, typically air. Light scattering optical elements typically comprise optically clear polymer or glass with high level of light transmission and refractive index greater than that of air which is 1.0. For example, polymethyl methacrylate (PMMA) is a common light scattering optical element material with refractive index of approximately 1.49. Some light does not internally reflect at the surface but rather escapes from the output face 6, typically with a light distribution centered at an angle less than 90 degrees from the output surface 6 and tilted away from the input face. Light that propagates through the light scattering optical element and exits through a light scattering optical element opposing face 5 is reflected back into the light scattering optical element by the reflector 8, the light scattering optical element opposing face effectively becoming in function a light scattering optical element input face. The reflector is typically a thin gauge metal sheet such as aluminum with a specular coating on its surface or thin gauge plastic reflective film. Plastic film suitable for use as a reflector is typically produced from PET, mylar, polyester or similar material with either coatings or additives and these films are typically white in appearance, and known as "white reflector film (WRF)" due to their broad spectrum reflectance of white light. Another approach, known as MCPET (meaning "micro-cavity PET) forms tiny voids or micro cavities in the PET. Typically white reflector films are used in backlighting of LCD displays and large edge lit signage. Are thin and flexible and easy to bend and can be cut to shape using a knife edge or a laser. The reflector 8 wraps around both the light scattering optical element opposing face 5 and light scattering optical element inner face 7. Light that escapes the light scattering optical element 3 through the inner face 7 is reflected back into the light scattering optical element 3. For a reflector that is a specular reflector, light reflects back towards the light scattering optical element at the same angle from normal as light incident onto the reflector. Reflectors with a component of diffuse reflectance will produce more light scattering and a more dispersed light reflection. The reflector or reflective surface is typically made from a bent cut out of a commercially available reflective coated aluminum sheet or a high reflective optical plastic film or sheet such as white PET, PC or PMMA. Such products are manufactured using techniques similar to those used to produce optical transmitting components 20. It's also possible to extrude, cast, stamp or otherwise form a rigid profile out of reflective material that is designed to conform to the desired shape to fit in the light module housing. It is also possible to use a highly reflective white paint or reflective coating applied to the inner surface of the lighting module housing to replace either of the inner face or opposing face reflectors.

Figure 8:
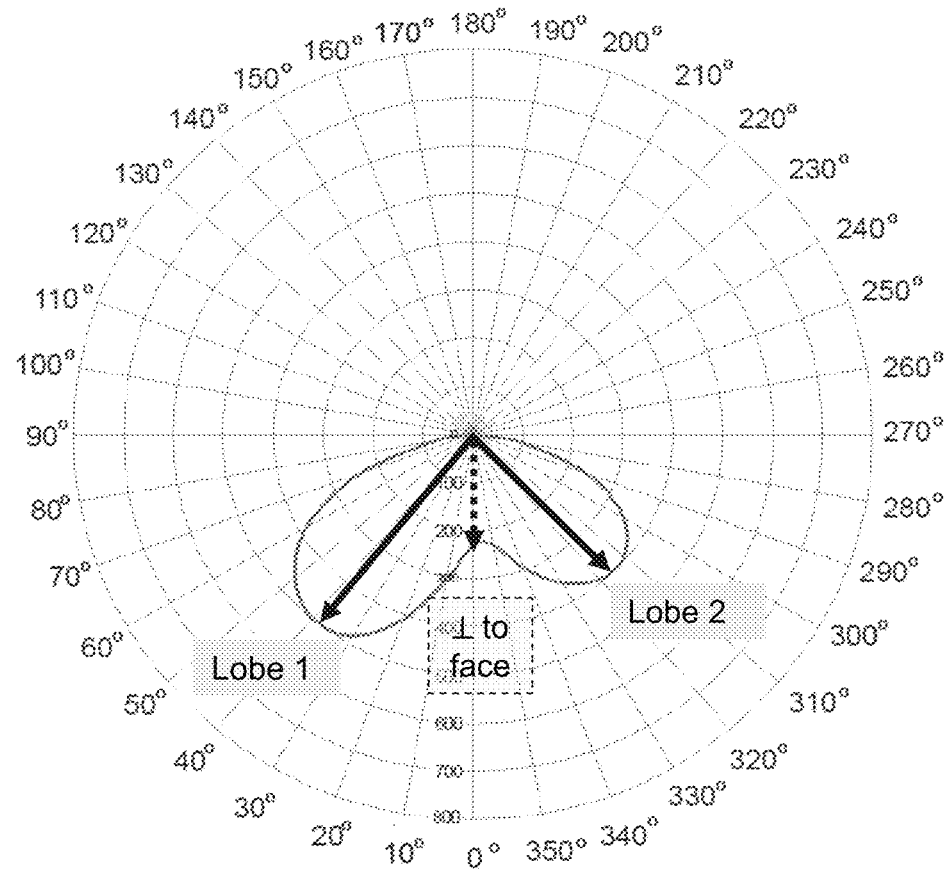
FIG. 8 is a polar plot showing cross-sectional angular light distribution of embodiment A2 lighting module.

FIG. 8 is a polar plot showing cross-sectional angular light distribution of embodiment A2 lighting module with surface features on the inner face of the light scattering optical element. The angular lobes are of a generally desirable bat wing type with the lobes at 40 degrees either side of the normal from the surface of the light scattering optical elements. Both lobes are approximately 60 degrees full width half maximum (FWHM) but the angular lobes are of unequal peak intensity and for most applications a more symmetric distribution would be preferred and specified.

Figure 9:
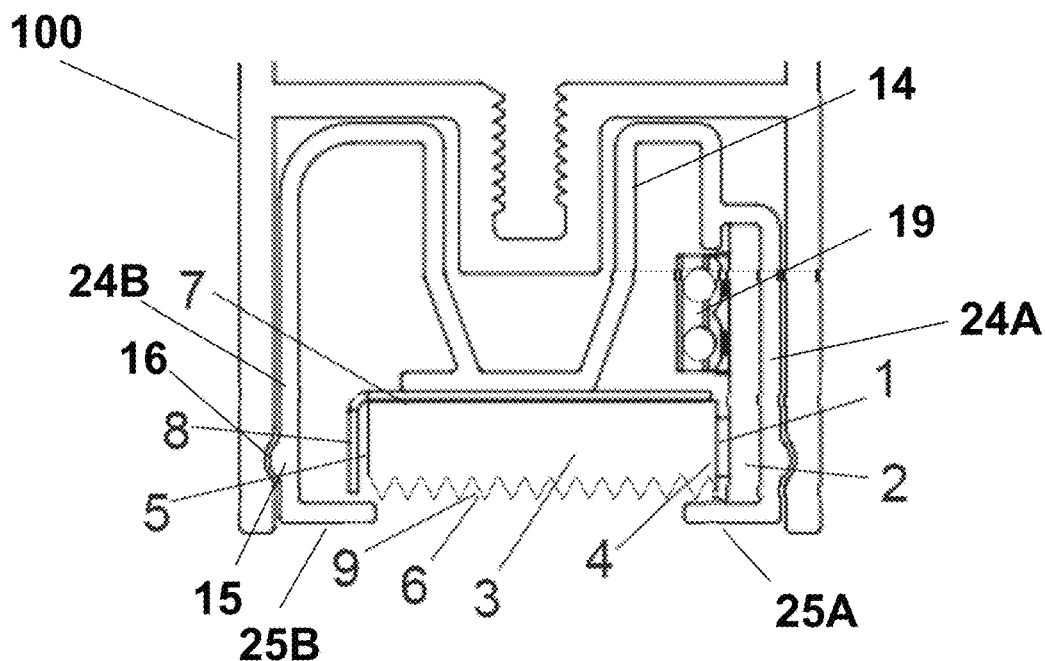
FIG. 9 is a cross-section view of lighting module embodiment A1.

FIG. 9 is a cross-section view of lighting module embodiment A1. This is the same as embodiment A2 except for the orientation of the light scattering optical element which has the surface features 9 positioned on the light scattering optical element output face 6 instead of on the light scattering optical element inner face 7 as in FIG. 7.

Figure 10:
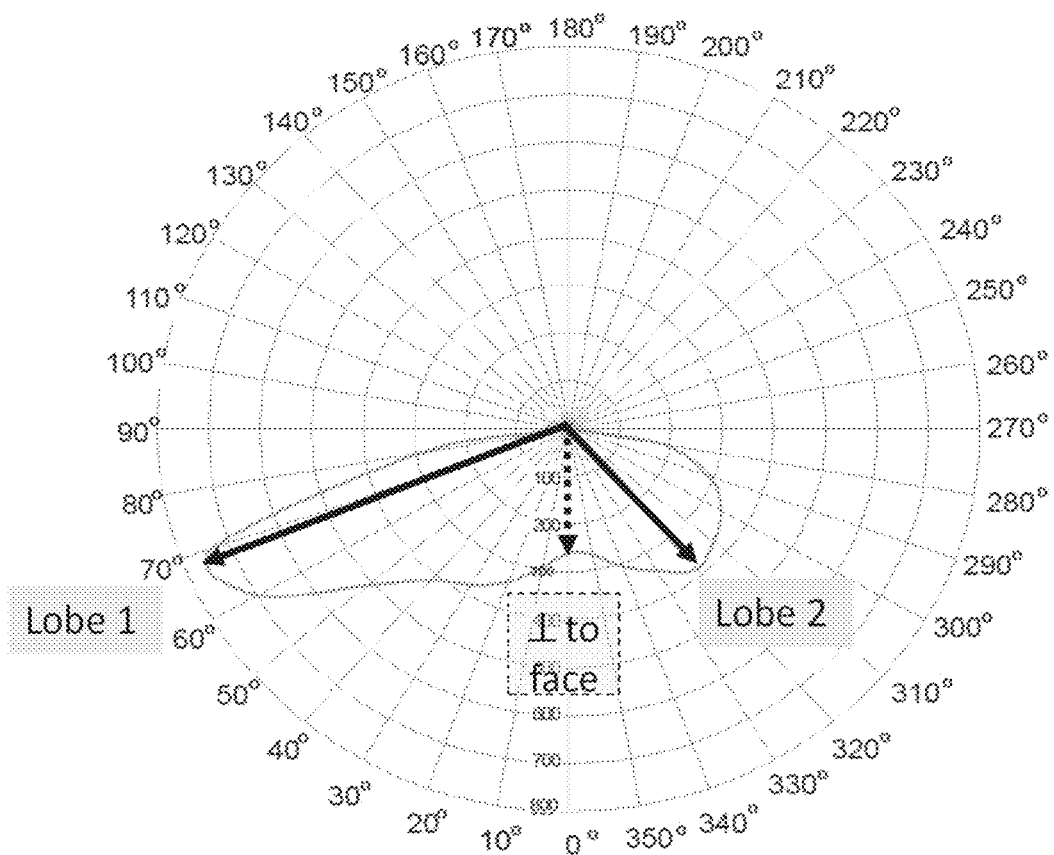
FIG. 10 is a polar plot showing cross-sectional angular light distribution of embodiment lighting module A1.

FIG. 10 is a polar plot showing cross-sectional angular light distribution of embodiment lighting module A1 with surface features on the output face of the light scattering optical element. The angular light distribution is more asymmetric with light emitted less normal to the output surface than embodiment A2 which has the light scattering optical element orientation reversed. One of the lobes still has a peak intensity at 40 degrees and it's width is still approximately 60 degrees FWHM whereas the other lobe now has a peak intensity at close to 70 degrees with a FWHM of approximately 40 degrees. This distribution is particularly useful for ceiling and wall washing in cove lighting applications.

Figure 11:
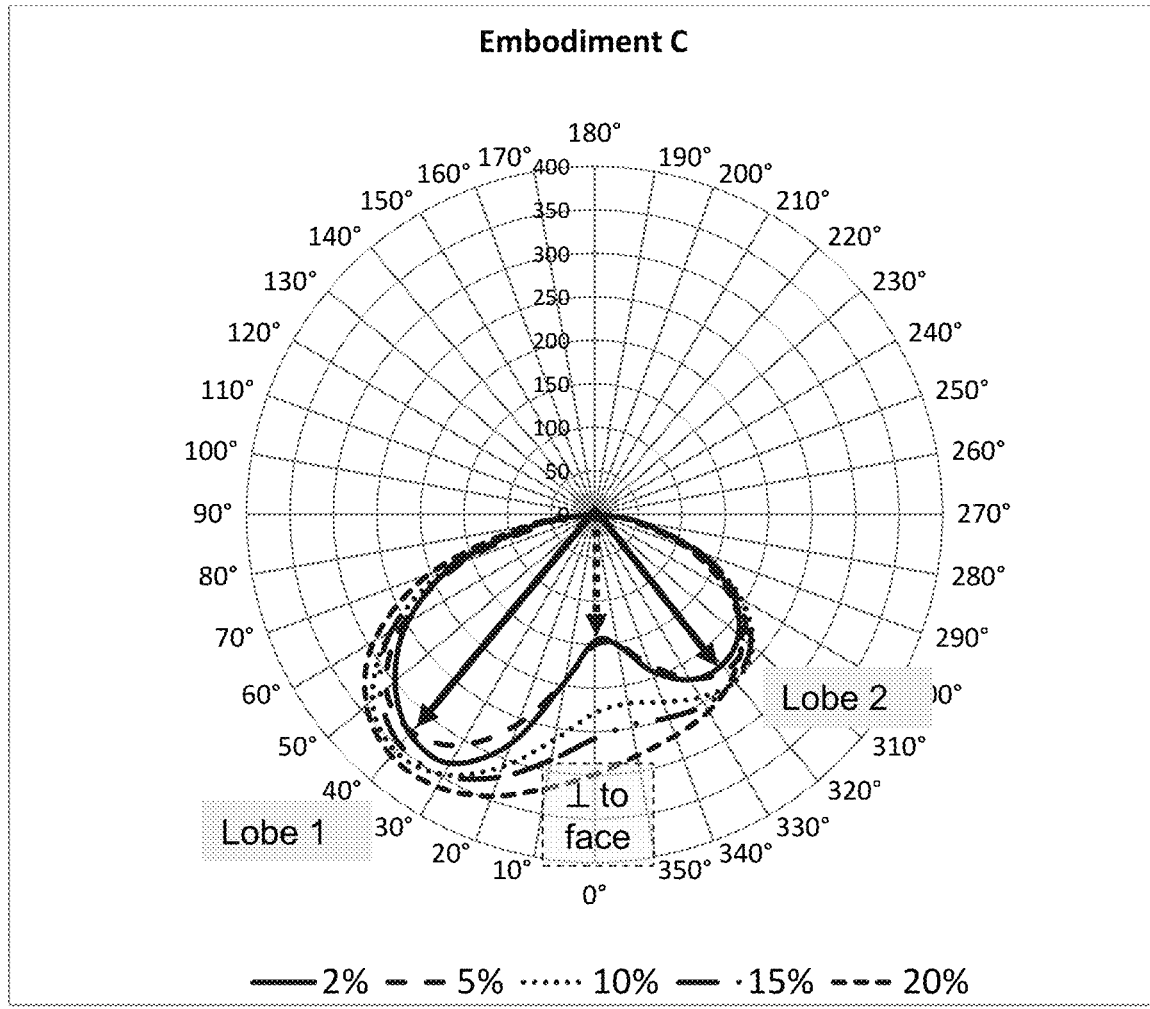
FIG. 11 is a polar plot relating to embodiment C and demonstrates effect of diffusion concentration on cross-sectional angular output.

FIG. 11 is a polar plot relates to embodiment C and demonstrates effect of diffusion concentration on cross-sectional angular output. Increasing diffusion concentration results in more overall output but less distinct bat wing lobes.

FIG. 12 is a polar plot demonstrating the cross-sectional angular output of embodiment module D showing symmetric batwing achieved with a light source input into only one face of a light scattering optical element. The batwing light distribution is desirable in many downlighting applications as it provides even illumination when projected onto flat surfaces such as floors and tables. To achieve this light distribution through a light scattering optical element with only one light source instead of the customary two provides reduced cost and a more narrow compact form factor.

FIG. 13 is a polar plot demonstrating the cross-sectional angular output of embodiment module D with different diffusion levels. The plots show the trends of increased luminous output and decreased angular asymmetry with increasing diffusion amount. The increased diffusion amount increases light scattering and the proportion of light which contacts a face of the light scattering optical element at an angle exceeding the critical angle of reflection thus exiting the light scattering optical element and not internally reflecting inside the light scattering optical element.

FIG. 14 and FIG. 15 are polar plots demonstrating the cross-sectional angular output of embodiment module E with the surface patterned face of the light scattering optical element as the output face (E1-FIG. 14) and inner face (E2-FIG. 15). In this embodiment the light scattering optical element has a pattern of surface lenticular area as illustrated as "Embodiment E" in FIG. 6. The light scattering optical element has a total width of 18 mm having on one 18 mm wide face an area of flat surface 6 mm wide and an area of lenticular pattern 12 mm wide. All plotted data is from testing done with the flat area of the patterned face adjacent to the input face of the light scattering optical element and the lenticular surface area positioned adjacent to face of the light scattering optical element opposing the input face. The plots show light distribution results with patterned lenticular face that are significantly different from and useful in a different manner than results from the full surface lenticular of embodiments A-D. In embodiments A-D the light distribution output in all cases is asymmetric with a larger lobe in the direction away from the light scattering optical element input face. In embodiment E the larger lobe of asymmetric output is in the direction toward the input light scattering optical element face. As diffusion level within the light scattering optical elements of embodiment E is increased, the light distribution shifts more away from the input face of the light scattering optical element. With increasing diffusion level, there is a level where there is a net balance of surface feature and volumetric diffusion that results in a balanced bat wing type light distribution having lobes of light distribution that are largely symmetric and similar. For embodiment E this diffusion level appears by interpolation of FIG. 14 and FIG. 15 plots to be somewhere between 5% and 8%. Another useful feature of the lighting distributions is that the angular spread of the lobes is increased. The peak intensity of the lobes now occurs at 50 degrees. A wider angular spread of the lobes is particularly useful for the indirect uplighting of ceilings or other surfaces.

FIG. 16 and FIG. 17 are polar plots demonstrating the cross-sectional angular output of embodiment module F with the surface patterned face of the light scattering optical element as the output face (F1-FIG. 16) and inner face (F2-FIG. 17). In this embodiment the light scattering optical element has a pattern of surface lenticular area as illustrated as "Embodiment F" in FIG. 6. This light scattering optical element is similar to embodiment E but the patterned surface is changed to have 12 mm of flat surface area width and 6 mm of lenticular surface area as compared to 6 mm flat and 12 mm lenticular surface areas of embodiment E. As evidenced by the light distribution polar plots in FIG. 16 and FIG. 17, the degree of light output oriented toward the light scattering optical element input face is reduced in embodiment F vs. embodiment E, apparently due to the reduced area of lenticular on the patterned surface. This indicates that the percentage of surface pattern with light redirecting feature chosen can be used to adjust the light distribution and achieve targeted outcomes such as batwing light distribution. In the case of embodiment F1 both lobes have a peak intensity at 60 degrees with a width approximately 50 degrees. This distribution is also particularly useful for illumination of ceiling in a linear uplight configuration.

FIG. 18 is a polar plot illustrating the asymmetric angular output of an embodiment module G. The asymmetric angular output was first generated by a diffuse planar light scattering optical element G10% which had no surface features and a 10% diffusion resin concentration which results in dispersed light scattering regions 21. The light scattering optical element G10% Etched on the other hand had one of the adjacent surfaces of the same planar light scattering optical element etched with a pattern generated by a laser. The etching process imparts tiny laser etched features 22 on top of the planar design of the non-etched light scattering optical element. Both the etched and non-etched diffuse planar light scattering optical elements produced an asymmetric distribution with one of the angular lobes greater than the intensity at normal. When comparing the output of the embodiment G using the etched light scattering optical element surface to the diffuse planar light scattering optical element it was noted that the lobes are both angled at 40 degrees from the normal. However the ratio of the peak intensity of the two lobes and width are significantly increased by the process of etching the surface. As with the more symmetric bi-lobed light distributions the angle from the normal of the larger lobe and its width can be modified by controlling light scattering optical element properties such as the shape and patterning of surface features and the level of volumetric scattering and reflector properties such as the relative degree of specular and diffuse reflectance. The angle can be further controlled by simply tilting the light module such that its output face becomes inclined at an oblique angle relative to the horizontal. The degree of inclination will add or subtract to the angle from the normal prior to the tilting. The light module output face can also be tilted to the point where it is vertical. Such an arrangement might be optimal for a wall washing application where it is desirable not to see any light emitting surface in front of the wall.

FIG. 19A and FIG. 19B details optical properties of diffuse sawtooth type light scattering optical elements and the photometric plots when used in a lighting module embodiment. FIG. 19A illustrates a bi-lobed distribution with the peak intensity of the lobes approximately equal but with the angular tilt of each lobe different, with one lobe being tilted at 60 degrees from the normal and the other tilted at 50 degrees. FIG. 19B illustrates a bi-lobed distribution with the peak intensity of the lobes significantly different and the angular tilt of each lobe also different, with one lobe being tilted at 60 degrees from the normal and the other tilted at 50 degrees.

FIGS. 20A, B, C and D detail optical properties of various diffuse layer type light scattering optical elements with clarity in the range of 3.9 to 15.2 and corresponding haze in the range of 86.3 to 94.9. Also included are the photometric plots for each light scattering optical element when used in a lighting module embodiment. Each of the embodiments produced similar bi-lobed and single lobed distributions to those produced by the planar lenticular, planar sawtooth and planar diffuse type embodiments with similar low clarity and high haze characteristics indicating that the performance of the light scattering optical element is preserved if the concentration of the light scattering regions is located in a layer close to the surface instead of being distributed evenly throughout its volume. The plots further show that as the light scattering increased and the clarity was reduced that the lighting distributions changed from bi-lobed in FIG. 20A to single lobed in FIG. 20D, thus indicating that the angular outputs can be controlled by varying the concentration of light scattering regions. This result is also consistent with the results of other embodiments disclosed.

FIG. 21 is a table summarizing the key optical measurements for each of the lighting module embodiments. For each embodiment, the percentage intensity of each lobe relative to the intensity at normal and the angle of each lobe from normal is provided. In each case of a batwing shaped distribution both lobes have an intensity that is greater than the intensity at normal. In the case of a asymmetric distribution only one of the lobes has an intensity that is greater, with the other lobes being substantially less than the normal intensity.

As demonstrated in the tables of FIG. 3A, FIG. 3B, and FIG. 21, specific light scattering optical element composition and surface features can be configured to create single edge it lighting modules with specific light distributions advantageous and desired for particular lighting applications. Furthermore, a single light scattering optical element configuration can be flipped or rotated in orientation relative to the reflector and LED board to enable two or more different light distributions with a single light scattering optical element. This is advantageous for a lighting fixture assembler as only one light scattering optical element component needs to be specified and supplied instead of multiple, typically leading to advantages in lower inventory and lower pricing. For on-site assembly, a single light scattering optical element with more than one possible light distributions enables light distribution selection to be made and evaluated on-site. On-site light scattering optical element configuration and changes are made easier by the removable lighting module embodiments such as shown in FIG. 7.

Figure 22A:
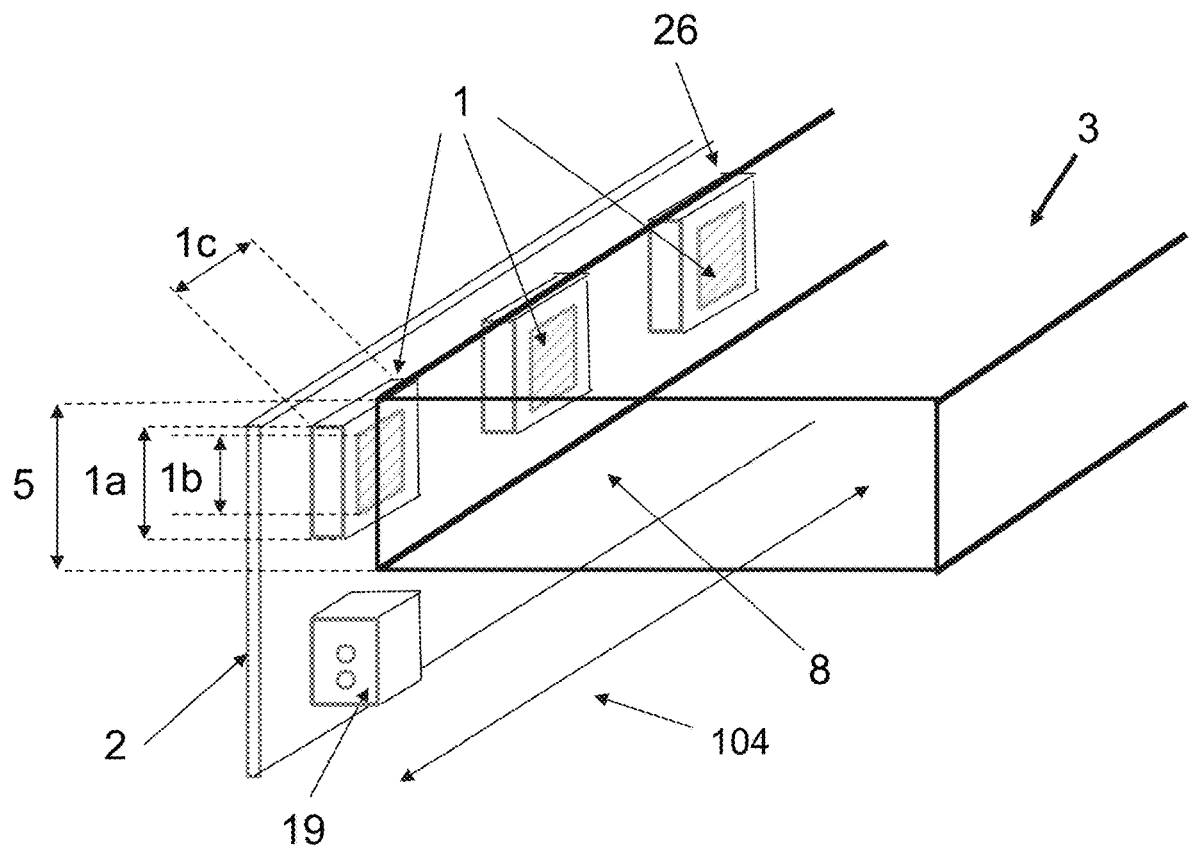
FIG. 22A is a perspective view of an embodiment LED board and edgelit light scattering optical element.

FIG. 22A is a cross sectional view showing LED light sources 1 mounted onto a printed circuit board (PCB) 2 and positioned proximate to the input face of the light scattering optical element with a small air gap 26. An electrical connector 19 is also mounted on the PCB and for optimum performance and increased efficiency it is desirable to have a highly reflective white solder mask 8 on the surface of the LED board 2. Height of light scattering optical element 5 is typically 30%-100% taller than the LED emitting area height $1b$, which may or may not be the same height as the LED package height $1a$, with the optimum for alignment in slim designs being about 50%. This is to ensure that the majority of light from the LED emitting surface is directing towards the input face. For example if the LED emitting area height $1b$ is 3.0 mm the chosen height of the light scattering optical element is 3.9 mm-6.0 mm with an optimum choice of 4.5 mm and vice versa. For typical indoor lighting applications LED the LED would be a full spectrum white color with CCT in range of 2200 to 5000K and CRI in range of 80 to 95. It's also possible to achieve tunable white and color mixing of red, green and blue LEDs by configuring the LED board appropriately. LED package height in embodiments is 3.0 mm for example 5630 or 3030 package chosen because these are most popular mid-power LED package for indoor lighting and typically deliver 25-100 lumens per package. Typically indoor linear lighting applications require 350-1000 lumens per foot and as a result a density of 12-48 LEDs per foot are used. For edge lighting it is important to have the LEDs spaced close together to avoid hotspots in the visual uniformity appearance and as a result the density of LEDs would be 36 or 48 LEDs per foot and in cases where there is a requirement for tunable white the density might be as high as 96 LEDs per foot (e.g. 2 channels of 48 LEDs per foot). The actual emitting area of an LED light source is typically less the full LED package area. As shown in FIG. 22A, the LED emitting area height $1b$ is less than the LED height $1a$. This is because there is a nominal package wall thickness due to encapsulation processes used in the manufacture of the LED package. The illustrated LED width $1c$ is the same as the LED height $1a$ as would be representative of a typical 3030 packaged LED light source. In the case of chip scale packaging the LED package height and the LED emitting area height are the same.

Figure 22B:
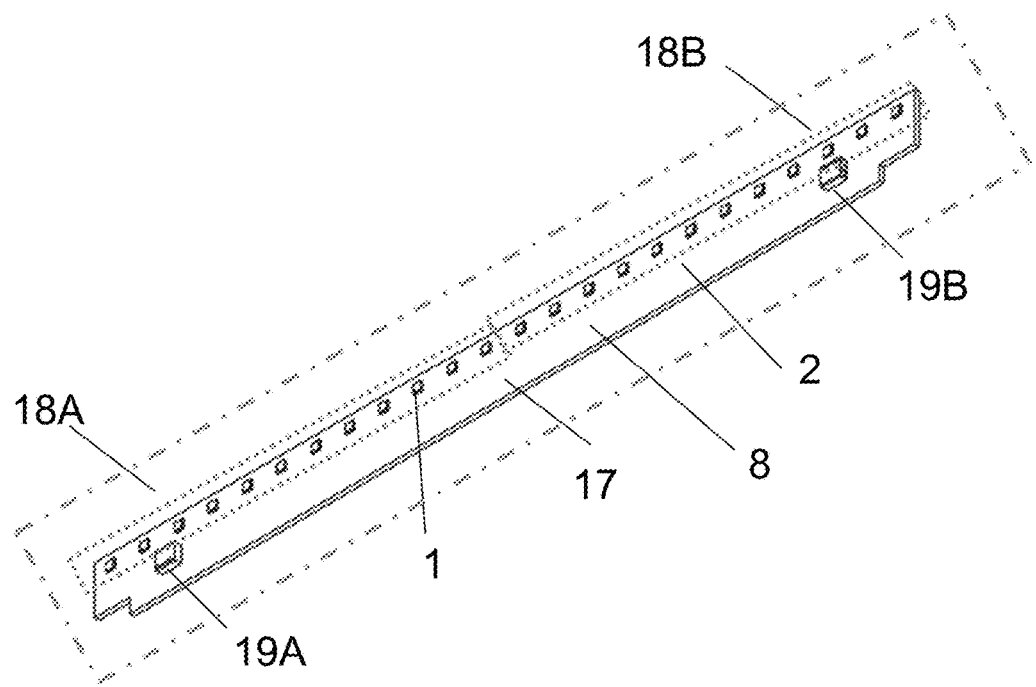
FIG. 22B is a perspective view of an embodiment two channel LED board.

FIG. 22B is a view of an LED board 2 comprising printed circuit board 17, with adjacent rows 18A and 18B of LEDs 1 and electrical connectors 19A and 19B as used in the various lighting module embodiments. In this case there are two collinear rows of LEDs each containing 12 LEDs in series. Electrical power is supplied to each row 18A and 18B via a surface mounted electrical connector 19A and 19B respectively. For optimum performance and increased efficiency it is desirable to have a highly reflective white solder mask on the LED board surface 8 which helps to redirect any reflected light from the input face back into the light scattering optical element for improved incoupling. Various embodiments also provide means for adjusting light distributions dynamically to control light output characteristics by controlling the input signals to the LED board included in the assembly. The number of LEDs in each row is determined by the chosen driver and controller. Typical commercially available drivers are classed as either constant current or constant voltage. Typical constant current drivers deliver a DC input voltage in the range of 30V to 48V. The forward voltage of LEDs is approximately 2.7V-2.8V. This means that rows of LEDs in series typically contain 10 to 16 LEDs. Fewer LEDs per row may also be used such as with a typical 12V or 24V constant voltage drivers which is a common configuration for LED tape lights. Adjacent rows can be arranged in a continuous line on the PCB as shown in FIG. 22A, or in parallel, or in an interleaving arrangement where LEDs of one row alternate with LEDs of another. Typically rows of LEDs are a few inches long and LED boards range in length from a few inches to 4 feet. The PCB is typically either FR4, a composite material, or metal core (MCPCB), and in most cases the electrical circuit is produced in copper or a similar highly conductive material. In the case of long lengths of linear lighting modules multiple LED boards are typically connected together in. It is also possible through simple modifications to the printed circuit board design to apply electrical power to one or more adjacent rows at the same time or control adjacent rows independently. When connecting multiple LED boards together it's useful to offset the positioning of connectors on the PCB such that they are not in line with the LED sources but rather offset and as such they are above or below the light scattering optical element and reflector when the PCB is mounted in the lighting module housing, as shown in FIG. 2A. This enables adjacent rows of LEDs to not be interrupted by connectors and avoids the problem of "connector shadow", a dark area visible on the light fixture or lighting module output face.

Figure 23B:
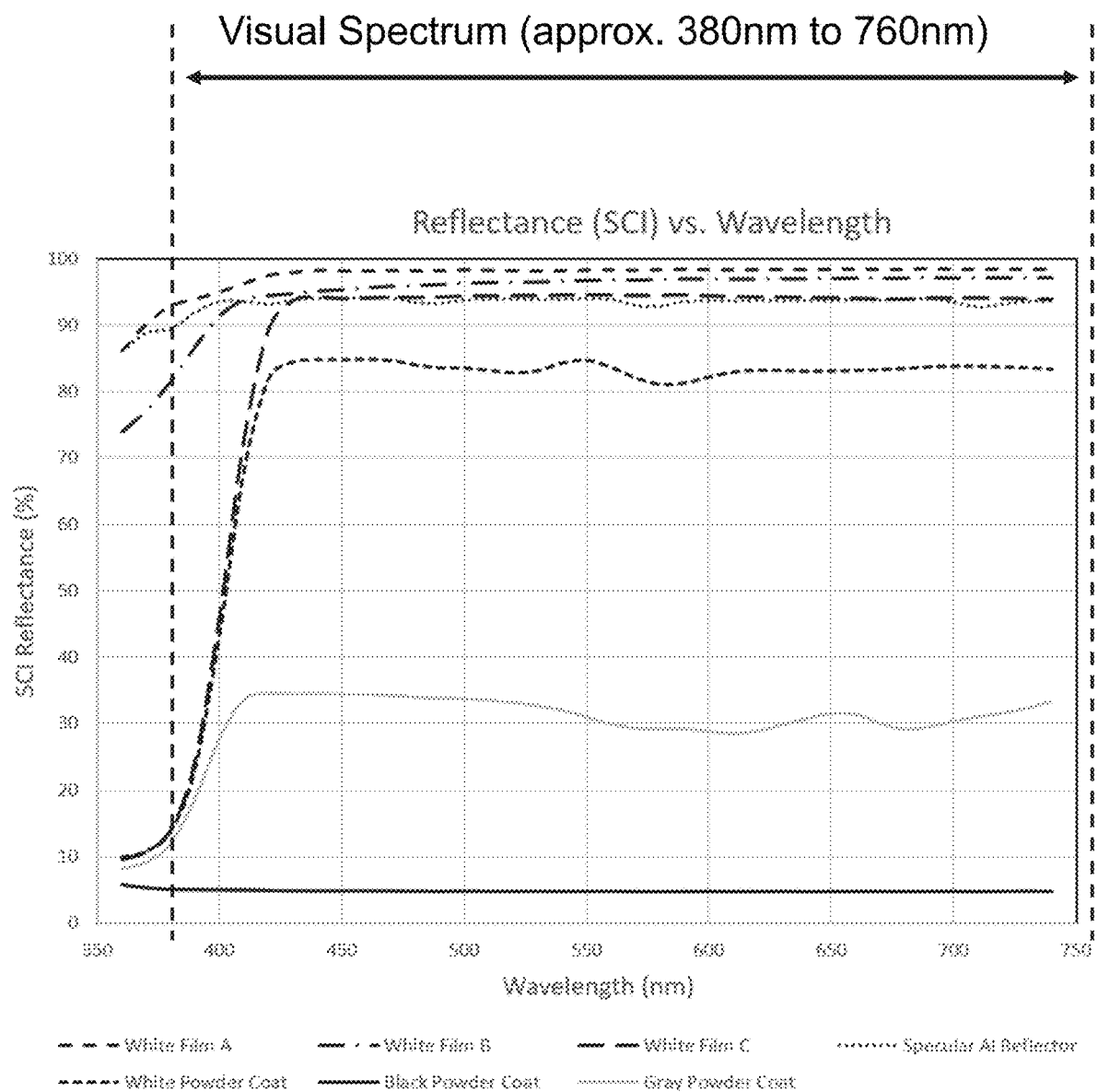
FIG. 23B is a chart of visual reflectance spectrum for various reflectors used in embodiments

FIG. 23A (data table) and FIG. 23B (spectral plot) show properties of specular reflectors and white reflector film (WRF) used in the lighting module and light fixture embodiments compared to black, grey and white powder coated samples. reflectance of some example light reflecting surfaces available for lighting module configurations. Powder coatings are commonly used to coat light fixtures and lighting modules but in general not highly reflective. White is the most reflective powder coat color but is significantly less reflective than the white reflector films and specular aluminum reflectors that can be configured in lighting modules. For example, the reflector 8 of lighting module embodiment shown in FIG. 1B can be configured with high reflectance white polymer films or specular metal surfaces for improved efficacy and energy efficiency. Additionally, different lighting module light distribution effects and visual appearance of brightness variation can be controlled by the selection of diffuse and/or specular reflectors. In the data table of FIG. 23A, SCI reflectance measurements represent "Specular Component Included" while SCE reflectance measurements represent "Specular Component Excluded" SCI measurement include the total reflected light while SCE measurements subtract the specular component and only measure diffuse reflectance. As can be seen by comparing the color properties of chromaticity [(x, y) and (u', v')] and yellowness index [YI(E313-96] there is significant color variation not only between different materials but between SCI and SCE measurements of a same material. When a material has significant difference in SCI and SCE color reflectance properties it has been found to contribute to lighting module and subsequently light fixture color vs. angle variation. Furthermore, it has been found that selection and configuration of reflective surfaces within embodiment lighting modules can be utilized to beneficially control and limit the amount of color variation in lighting modules.

FIG. 23A is a table showing the properties of specular reflectors and white reflector film (WRF) used in the lighting module and light fixture embodiments compared to black, grey and white powder coated samples. The specular reflectors used exhibit significantly higher levels of reflectance when compared to the paint samples. Significantly; the paint samples also impair a "color bias" based upon a substantial change in the yellowness index. If an embodiment white reflector film (WRF) and specular reflector of the embodiments are not used then the resulting lighting distributions will have a significant change in color when compared to the original color from the LED being used. Also, merely using powder coated paint will result in a substantial drop in overall optical efficiency and reduction in lumens per watt (L/W) from the lighting module or light fixture. It is possible to incorporate surface properties of the specular reflector or WRF in the lighting module housing by specialized coating formulations or lamination for instance. It is also possible to achieve similar results by laminating or coating reflective surfaces to the inner face and opposing face of the edge-lit diffuser. FIG. 23B is a chart showing reflectance with specular component included (SCI) versus wavelength. This chart further highlights the importance of choosing an optimal reflector with a high level of reflectance across the entire visible range (380 nm-750 nm).

List of Numerical References
LED light source
1a LED package height
1b LED emitting area height
1c LED length
2 LED board
3 Optical element
4 Optical element input face
5 Optical element opposing face
6 Optical element output face
7 Optical element inner face
8 Reflector or reflective surface
9 Surface Features
10 Lenticular surface
11 Flat surface
12 Height
13 Width
14 Lighting module housing
15 Linear bump in lighting module housing
16 Linear notch in light fixture housing
17 Printed circuit board (PCB)
18 Row of LEDs
19 Electrical connector
20 Optically transmitting component
21 Light scattering region
22 Laser etched surface features
23 Electrical driver or controller
24 Lighting module side wall portion
25 Lighting module supporting ledge
26 Air or air gap
30 Lens
31 Light source
32 Sample
33 Port
34 Integrating sphere
35 Sensor module
36 Center sensor
37 Ring sensor
100 Light fixture housing
101 Wire hanger
102 Light fixture output face
103 Light fixture end cap
104 Length

What is claimed is:
1. A single edge-lit lighting module comprising;
a) A light scattering optical element comprising;
   i) a volume of optically transmissive bulk material comprising one or more light scattering regions of optically clear material with dispersed light scattering particles of differing refractive index in a configured concentration, further comprising;
   ii) an input face;
   iii) an opposing face non-adjacent to the input face;
   iv) an inner face adjacent to the input face;
   v) an outer face adjacent to the input face;
   vi) a cross sectional height defined by the distance between the inner face and outer face;
   wherein the magnitude of light scattering as measured through the cross-sectional height using techniques consistent with the ASTM D1003 standard is characterized by clarity of less than 25%;
b) one or more LED light sources mounted onto a printed circuit board positioned adjacent to the light scattering optical element and inputting light into its input face wherein a height of the one or more LED light sources is less than the height of the light scattering optical element;

c) a first reflective surface positioned external of the light scattering optical element and proximate to its inner face wherein light exiting the inner face is reflected back into the light scattering optical element from the first reflective surface;

d) a second reflective surface positioned external of the light scattering optical element and proximate to its opposing face wherein light exiting the opposing face is reflected back into the light scattering optical element from the second reflective surface e) a housing configured to support and hold the light scattering optical element, the one or more LED light sources, the printed circuit board, and the first and second reflective surfaces in alignment;

wherein the light output from the light scattering optical element output face is of a non-lambertian light distribution comprising one or more lobes wherein a peak intensity axis of each lobe is angularly oriented in an oblique, non-normal direction with respect to the output face of the lighting module and the intensity of at least one of the lobes is greater than the output intensity normal to its outer face.

2. The lighting module of claim 1 wherein the light scattering optical element is planar with the height less than 5 mm.

3. The lighting module of claim 1 in which a width of the light scattering optical element is less than 30 mm.

4. The lighting module of claim 1 wherein the optically transmissive bulk material is either polymer or glass and has a refractive index greater than 1.0.

5. The lighting module of claim 1 wherein the dispersed light scattering particles are comprised of microbeads of optically clear material.

6. The lighting module of claim 5 wherein the microbeads comprise PMMA or acrylic.

7. The lighting module of claim 1 wherein a single light scattering region comprises the entire volume of optically transmissive bulk material of the light scattering optical element.

8. The lighting module of claim 1 in which the light scattering optical element is comprised of a light scattering region configured as a layer or surface coating of thickness that is a portion of the cross sectional height.

9. The light scattering optical element of claim 8 having a layer of light scattering region with a thickness in the range of 50 um to 500 um.

10. The light scattering optical element of claim 8 having a surface coating light scattering region with a thickness in the range of 25 µm to 250 µm.

11. The lighting module of claim 1 wherein a full width half max (FWHM) scattering angle is greater than 5 degrees.

12. The lighting module of claim 1 wherein the light scattering optical element further comprises surface features upon a face adjacent to the input face.

13. The lighting module of claim 12 in which the light scattering optical element surface features adjusts a symmetry of the angular output versus a light scattering optical element equivalent in bulk material and dispersed regions without surface features.

14. The lighting module of claim 12 wherein the light scattering optical element has surface features on the light scattering optical element outer face.

15. The lighting module of claim 12 wherein the light scattering optical element has surface features on the light scattering optical element inner face.

16. The lighting module of claim 12 in which the surface features comprise a full or partial geometric shape of a sphere, paraboloid, ellipsoid, polyhedron, or polyhedron frustum.

17. The lighting module of claim 12 wherein the surface features re-direct light.

18. The lighting module of claim 12 in which the surface features comprise a lenticular pattern.

19. The lighting module of claim 12 in which the surface features are arranged in a pattern.

20. The lighting module of claim 18 wherein the pattern includes flat areas of no surface features.

21. The lighting module of claim 18 in which the surface feature pattern is comprised of a specific cross-sectional shape comprising a full or partial geometric form of a polygon, truncated polygon, concave polygon, convex polygon, parabola, ellipse, sphere, or arc.

22. The lighting module of claim 12 wherein a presence of surface features on either the inner face or outer face of the light scattering optical element is selectively chosen by orientation of the light scattering optical element with respect to the first reflective surface.

23. The lighting module of claim 22 wherein when surface features are on the inner face of the light scattering optical element the light distribution is divided by an optical axis normal to the outer face into two portions of substantially equal integrated intensity over angle and when surface features are on the outer face of the light scattering optical element the light distribution is divided by the optical axis normal to the outer face into two portions of substantially unequal integrated intensity over angle.

24. The lighting module of claim 1 further comprising dispersed additives to the optical material that reduce smoothness or gloss of the light scattering optical element inner face or outer face.

25. The lighting module of claim 1 wherein the light scattering optical element is fabricated using an extrusion, casting, coating, lamination or injection molding process.

26. The lighting module of claim 1 wherein the first and second reflective surfaces are regions of a single reflector that wraps around 2 or more faces of the light scattering optical element.

27. The lighting module of claim 26 wherein the reflector is a plastic white reflector film.

28. The lighting module of claim 1 wherein the first reflective surface or second reflective surface produce specular reflectance of incident light.

29. The lighting module of claim 1 wherein the first reflective surface or second reflective surface produce diffuse reflectance of incident light.

30. The lighting module of claim 1 having two light scattering optical element outer face light distribution lobes which are of substantially similar peak intensity.

31. The lighting module of claim 1 having two light scattering optical element outer face light distribution lobes which are of substantially similar shape.

32. The lighting module of claim 1 having two light scattering optical element outer face light distribution lobes which are of substantially similar tilt degree with respect to normal but oriented in opposing directions.

33. The lighting module of claim 1 having two light scattering optical element outer face light distribution lobes wherein a lobe 1 has a greater peak intensity than a lobe 2.

34. The lighting module of claim 1 having two light scattering optical element outer face light distribution lobes wherein a lobe 1 has a greater angle of tilt than a lobe 2.

35. The lighting module of claim 1 having two light scattering optical element outer face light distribution lobes with a local minimum intensity point between the two lobe peaks.

36. The lighting module of claim 34 wherein the local minimum intensity point between two lobe peaks is at or near an axis normal to the outer face.

37. The lighting module of claim 34 wherein the local minimum intensity point between two lobe peaks is offset from an axis normal to the outer face.

38. The lighting module of claim 1 having two light scattering optical element outer face light distribution lobes which are divided by an optical axis normal to the outer face into two portions of substantially equal integrated intensity over angle.

39. The lighting module of claim 1 having two light scattering optical element outer face light distribution lobes which are divided by an optical axis normal to the outer face into two portions of substantially unequal integrated intensity over angle.

40. The lighting module of claim 1 wherein the adjacent face is perpendicular to the input face.

* * * * *